United States Patent
Kripalani

(10) Patent No.: US 9,021,452 B2
(45) Date of Patent: Apr. 28, 2015

(54) AUTOMATIC IDENTIFICATION OF STORAGE REQUIREMENTS, SUCH AS FOR USE IN SELLING DATA STORAGE MANAGEMENT SOLUTIONS

(71) Applicant: CommVault Systems, Inc., Oceanport, NJ (US)

(72) Inventor: Sanjay Harakhchand Kripalani, Morganville, NJ (US)

(73) Assignee: CommVault Systems, Inc., Tinton Falls, NJ (US)

( * ) Notice: Subject to any disclaimer, the term of this patent is extended or adjusted under 35 U.S.C. 154(b) by 258 days.

(21) Appl. No.: 13/777,718

(22) Filed: Feb. 26, 2013

(65) Prior Publication Data

US 2014/0189680 A1     Jul. 3, 2014

Related U.S. Application Data

(60) Provisional application No. 61/746,239, filed on Dec. 27, 2012.

(51) Int. Cl.
*G06F 9/44* (2006.01)
*G06F 9/445* (2006.01)
*G06F 11/36* (2006.01)
(Continued)

(52) U.S. Cl.
CPC .............. *G06F 8/61* (2013.01); *G06F 11/3664* (2013.01); *G06Q 30/0283* (2013.01); *G06F 21/10* (2013.01); *G06F 9/45504* (2013.01); *G06F 17/30067* (2013.01); *G06F 17/30864* (2013.01);

(Continued)

(58) Field of Classification Search
None
See application file for complete search history.

(56) References Cited

U.S. PATENT DOCUMENTS 4,686,620 A    8/1987  Ng
4,995,035 A    2/1991  Cole et al.
(Continued)

FOREIGN PATENT DOCUMENTS

EP             0259912        3/1988
EP             0405926 A2     1/1991
(Continued)

OTHER PUBLICATIONS

"2003 GOLD: CommVault QiNetix 4.2," SearchStorage.com, downloaded from: searchstorage.techtarget.com/news/article/0,289142,sid5 gci942854,00.html, Dec. 30, 2003, pp. 1-3.
(Continued)

*Primary Examiner* — Lewis A Bullock, Jr.
*Assistant Examiner* — Tina Huynh
(74) *Attorney, Agent, or Firm* — Perkins Coie LLP

(57) ABSTRACT

Systems and methods for demonstrating a replacement information management software for a computing system. The methods may include determining if existing information management software is installed in the computing system. The methods may include identifying computing devices of the computing system using information from the existing information management software. The methods may include simulating the replacement information management software with characteristics of the identified computing devices to enable a user to experience the replacement information management software prior to committing to installing the replacement information management software in the computing system. The methods may include automatically installing the replacement information management software. Other implementations are disclosed.

20 Claims, 15 Drawing Sheets

(51) Int. Cl.
*G06Q 30/02* (2012.01)
*G06F 21/10* (2013.01)
*G06F 9/455* (2006.01)
*G06F 17/30* (2006.01)
*H04L 12/801* (2013.01)
*G06Q 30/06* (2012.01)

(52) U.S. Cl.
CPC ........... *H04L 47/10* (2013.01); *G06F 17/30286* (2013.01); *G06Q 30/0641* (2013.01)

(56) References Cited

U.S. PATENT DOCUMENTS

| | | |
|---|---|---|
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,491,810 A | 2/1996 | Allen |
| 5,504,873 A | 4/1996 | Martin et al. |
| 5,544,345 A | 8/1996 | Carpenter et al. |
| 5,559,957 A | 9/1996 | Balk |
| 5,619,644 A | 4/1997 | Crockett et al. |
| 5,638,509 A | 6/1997 | Dunphy et al. |
| 5,678,042 A | 10/1997 | Pisello et al. |
| 5,699,361 A | 12/1997 | Ding et al. |
| 5,729,743 A | 3/1998 | Squibb |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 6,021,415 A | 2/2000 | Cannon et al. |
| 6,026,414 A | 2/2000 | Anglin |
| 6,076,148 A | 6/2000 | Kedem |
| 6,094,416 A | 7/2000 | Ying |
| 6,131,095 A | 10/2000 | Low et al. |
| 6,131,147 A | 10/2000 | Takagi |
| 6,131,190 A | 10/2000 | Sidwell |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,301,592 B1 | 10/2001 | Aoyama et al. |
| 6,324,581 B1 | 11/2001 | Xu et al. |
| 6,330,570 B1 | 12/2001 | Crighton |
| 6,330,642 B1 | 12/2001 | Carteau |
| 6,343,324 B1 | 1/2002 | Hubis et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,625,747 B1 | 9/2003 | Tawil et al. |
| 6,658,436 B2 | 12/2003 | Oshinsky et al. |
| 6,658,526 B2 | 12/2003 | Nguyen et al. |
| 6,771,595 B1 | 8/2004 | Gilbert et al. |
| 6,820,035 B1 | 11/2004 | Zahavi |
| 7,035,880 B1 | 4/2006 | Crescenti et al. |
| 7,082,441 B1 | 7/2006 | Zahavi et al. |
| 7,085,904 B2 | 8/2006 | Mizuno et al. |
| 7,093,089 B2 | 8/2006 | de Brebisson |
| 7,096,269 B2 | 8/2006 | Yamagami |
| 7,096,315 B2 | 8/2006 | Takeda et al. |
| 7,103,740 B1 | 9/2006 | Colgrove et al. |
| 7,130,970 B2 | 10/2006 | Devassy et al. |
| 7,146,377 B2 | 12/2006 | Nowicki et al. |
| 7,171,459 B2 | 1/2007 | Sanghvi et al. |
| 7,197,490 B1 | 3/2007 | English |
| 7,203,944 B1 | 4/2007 | van Rietschote et al. |
| 7,213,040 B1 | 5/2007 | Stokes et al. |
| 7,216,244 B2 | 5/2007 | Amano |
| 7,275,103 B1 | 9/2007 | Thrasher et al. |
| 7,328,260 B1 | 2/2008 | Muthiyan et al. |
| 7,343,356 B2 | 3/2008 | Prahlad et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,395,282 B1 | 7/2008 | Crescenti et al. |
| 7,401,338 B1 | 7/2008 | Bowen et al. |
| 7,403,987 B1 | 7/2008 | Marinelli et al. |
| 7,454,569 B2 | 11/2008 | Kavuri et al. |
| 7,765,167 B2 | 7/2010 | Prahlad et al. |
| 8,306,926 B2 | 11/2012 | Prahlad et al. |
| 2002/0059471 A1 | 5/2002 | Sanghvi et al. |
| 2002/0188711 A1 | 12/2002 | Meyer et al. |
| 2003/0065759 A1 | 4/2003 | Britt et al. |
| 2003/0149761 A1 | 8/2003 | Baldwin et al. |
| 2003/0179227 A1 | 9/2003 | Ahmad et al. |
| 2003/0188233 A1 | 10/2003 | Lubbers et al. |
| 2005/0091369 A1 | 4/2005 | Jones |
| 2005/0138517 A1 | 6/2005 | Monitzer |
| 2005/0188252 A1 | 8/2005 | Amano |
| 2005/0251540 A1 | 11/2005 | Sim-Tang |
| 2006/0004765 A1 | 1/2006 | Anderson et al. |
| 2006/0069863 A1 | 3/2006 | Palmer et al. |
| 2007/0198802 A1 | 8/2007 | Kavuri |
| 2008/0059704 A1 | 3/2008 | Kavuri |
| 2008/0126704 A1 | 5/2008 | Ulrich et al. |
| 2008/0177971 A1 | 7/2008 | Prahlad et al. |
| 2009/0089499 A1 | 4/2009 | Abe |
| 2009/0113056 A1 | 4/2009 | Tameshige et al. |
| 2009/0300412 A1 | 12/2009 | Soran et al. |

FOREIGN PATENT DOCUMENTS

| | | |
|---|---|---|
| EP | 0467546 A2 | 1/1992 |
| EP | 0774715 | 5/1997 |
| EP | 0809184 | 11/1997 |
| EP | 0899662 | 3/1999 |
| EP | 0981090 | 2/2000 |
| WO | WO-9513580 | 5/1995 |
| WO | WO-9912098 | 3/1999 |

OTHER PUBLICATIONS

"CommVault QiNetix: Dynamic Data Management," Product brochure downloaded from: www.stephord.com/book%5CQiNetix_Brochure.pdf, CommVault Systems, Inc., © 2003, pp. 1-6.

"CommVault QiNetix: Galaxy Backup and Recovery—Data Protection," Product brochure downloaded from: www.hitachidatasystems.com/assets/pdf/ProductTriF old_Galaxy .pdf, Comm Vault Systems, Inc., © 2002, pp. 1-5.

"CommVault QiNetix: Galaxy iDataAgent for SharePoint Portal Server," Product brochure downloaded from: directory .partners. extranet.microsoft.com/collaterai/2123/DS_GBR_MSFTSPPServer .pdf, CommVault Systems, Inc., © 2002, pp. 1-2.

Agrawal, Dakshi, et al., "Policy-Based Validation of SAN Configuration", Policy '04, Jun. 7-9, 2004, pp. 77-86.

Beck, Micah, et al., "The Internet2 Distributed Storage Infrastructure Project: An Architecture for Internet Content Channels", Computer Networks and ISDN Systems, vol. 30, Issues 22-23, Nov. 1998, pp. 2141-2148.

(56) References Cited

OTHER PUBLICATIONS

Charlu, Daniel, "HP Hyperplex Clustering Technology", Proc. of the 1st IEEE Computer Science Workshop on Cluster Computing, Melbourne, Australia, Dec. 2-3, 1999, pp. 347-356.
Hirao, Tetsuhiro, et al., "Resource Management", Fujitsu Tech. J., vol. 40, No. 1, Jun. 2004, pp. 123-132.
Kaczmarski, M., et al., "Beyond Backup Toward Storage Management", IBM Systems Journal, vol. 42, No. 2, Apr. 2003, pp. 322-337.
Menon, Jai, et al., "IBM Storage Tank—A Heterogeneous Scalable SAN File System", IBM Systems Journal, vol. 42 No. 2, © 2003, pp. 250-267.
Schultz, Nick, "QiNetix from CommVault", Computer Technology Review, Oct. 1, 2002, one page.
Supplementary European Search Report for PCT/US2005/015202, mailing date Mar. 16, 2010, 3 pages.
Armstead et al., "Implementation of a Campwide Distributed Mass Storage Service: The Dream vs. Reality," IEEE, Sep. 11-14, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Jander, M., "Launching Storage-Area Net," *Data Communications*, US, McGraw Hill, NY, vol. 27, No. 4 (Mar. 21, 1998), pp. 64-72.
Gait, J., "The Optical File Cabinet: A Random-Access File System for Write-Once Optical Disks," *IEEE Computer*, vol. 21, No. 6, pp. 11-22 (Jun. 1988).
Rosenblum et al., "The Design and Implementation of a Log-Structured File System," *Operating Systems Review SIGOPS*, vol. 25, No. 5, New York, US, pp. 1-15 (May 1991).
Non-Final Office Action for, mailing date May 11, 2009, 5 pages.
Non-Final Office Action for, mailing date May 13, 2009, 5 pages.
Eitel, "Backup and Storage Management in Distributed Heterogeneous Environments," IEEE, Jun. 12-16, 1994, pp. 124-126.

FIG. 12B

License Usage

CommCell ID: F983D
IP Address: 172.19.100.109
OEM ID: 1
OEM License Type: 0
Activation Key: 
License Mode: Production
Expiration Date: Does Not Expire

← 1215

| License Type | Permanent Total | Permanent Used | Evaluation Available | Evaluation Used |
|---|---|---|---|---|
| iDataAgent for Windows Server Class File System | 200 | 1 | 39 | 0 |
| iDataAgent for Windows Desktop Class File System | 100 | 0 | 20 | 0 |
| iDataAgent for Lotus Notes Database on Unix | 50 | 0 | 10 | 0 |
| iDataAgent for Lotus Notes Database on MS Windows | 50 | 0 | 10 | 0 |
| iDataAgent for Lotus Notes Document on Unix | 50 | 0 | 10 | 0 |
| iDataAgent for Lotus Notes Document on MS Windows | 50 | 0 | 10 | 0 |
| iDataAgent for Exchange Database | 50 | 0 | 10 | 0 |
| iDataAgent for Exchange Mailbox | 50 | 0 | 10 | 0 |
| iDataAgent for Microsoft SQL Server | 50 | 0 | 10 | 0 |
| Library Control Module | 50 | 0 | 10 | 0 |
| MediaAgent for Microsoft Windows | 50 | 0 | 10 | 0 |
| MediaAgent for Hewlett Packard HP-UX | 50 | 0 | 10 | 0 |
| MediaAgent for Sun Solaris | 50 | 0 | 10 | 0 |
| MediaAgent for IBM AIX | 50 | 0 | 10 | 0 |
| MediaAgent for Linux | 50 | 0 | 10 | 0 |
| iDataAgent for Informix Database on Windows | 50 | 0 | 10 | 0 |
| iDataAgent for Informix Database on Unix | 50 | 0 | 10 | 0 |
| iDataAgent for Sybase Database on Windows | 50 | 0 | 10 | 0 |
| iDataAgent for Sybase Database on UNIX | 50 | 0 | 10 | 0 |
| iDataAgent for IBM AIX File System | 50 | 0 | 10 | 0 |
| iDataAgent for Linux File System | 50 | 0 | 10 | 0 |
| iDataAgent for Novell NetWare File System | 50 | 0 | 10 | 0 |
| iDataAgent for Novell Directory Services | 50 | 0 | 10 | 0 |
| iDataAgent for NetApp NAS NDMP | 50 | 0 | 10 | 0 |
| Shared Storage License | 50 | 0 | 10 | 0 |
| iDataAgent for Hewlett Packard HP-UX File System | 50 | 0 | 10 | 0 |
| iDataAgent for Sun Solaris File System | 50 | 0 | 10 | 0 |
| iDataAgent for Oracle Database on Unix | 50 | 0 | 10 | 0 |
| iDataAgent for Oracle on MS Windows | 50 | 0 | 10 | 0 |
| iDataAgent for EMC Celerra NAS NDMP | 50 | 0 | 10 | 0 |
| iDataAgent for Multi Vender NAS NDMP | 50 | 0 | 10 | 0 |
| iDataAgent for ProxyHost on MS Windows | 50 | 0 | 10 | 0 |
| iDataAgent for TRU64 File System | 50 | 0 | 10 | 0 |
| iDataAgent for MS Exchange Public Folder/Web Folder | 50 | 0 | 10 | 0 |

Backup Job Summary Report 1300

Report 9.0.0(BUILD84) generated on 09/19/2012 18:53:31
CommCell ID: F983D
CommCell: 892NCUA_cn -- Report Criteria --

- Job ID:All
- Group By:Client
- Backup Types:Full, Incremental, Differential, Synthetic Full
- Job Status:All
- Include:Failure Reason, Job Description
- Computers:All
- Agent Types:All
- Throughput Unit:GB/Hour
- Locale:English
- Show Time in TimeZone: CommServe
- Time Zone: (UTC-05:00) Eastern Time (US & Canada)
- View from: 09/10/2012 16:00:00
- View to: 09/17/2012 16:00:00

1305

| Client | Total Jobs | Completed | Completed with errors | Completed with warnings | Killed | Unsuccessful | Running | Delayed | No Run | No Schedule | Size of Application (Compression Rate) | Data Written | Start Time | End Time | Protected Objects | Failed Objects | Failed Folders |
|---|---|---|---|---|---|---|---|---|---|---|---|---|---|---|---|---|---|
| All | 323 | 270 | 13 | 0 | 0 | 40 | 0 | 0 | 0 | 4 | 11404.22 GB | 15536.84 GB | 09/11/2012 04:00:00 | 09/17/2012 22:00:03 | 23,026,163 | 0 | 0 |
| 892NCUA_cn | 6 | 0 | 0 | 0 | 0 | 6 | 0 | 0 | 0 | 4 | 0 | 0 | N/A | N/A | 0 | 0 | 0 |
| ADRAPToolsSvr | 1 | 1 | 0 | 0 | 0 | 0 | 0 | 0 | 0 | 0 | 0 | 0 | 09/14/2012 10:00:00 | 09/15/2012 10:36:33 | 0 | 0 | 0 |
| APPSERVER | 1 | 1 | 0 | 0 | 0 | 0 | 0 | 0 | 0 | 0 | 40.29 GB | 0 | 09/14/2012 10:00:00 | 09/14/2012 10:41:52 | 60,137 | 0 | 0 |
| dmcuasql.ncua.lan | 1 | 1 | 0 | 0 | 0 | 0 | 0 | 0 | 0 | 0 | 587.72 GB | 587.72 GB | 09/15/2012 10:00:00 | 09/15/2012 13:54:42 | 122,464 | 0 | 0 |
| HQAiresSearch | 1 | 1 | 0 | 0 | 0 | 0 | 0 | 0 | 0 | 0 | 30.10 GB | 0 | 09/14/2012 10:00:00 | 09/14/2012 10:25:02 | 103,105 | 0 | 0 |
| HQBES | 1 | 1 | 0 | 0 | 0 | 0 | 0 | 0 | 0 | 0 | 41.11 GB | 0 | 09/14/2012 10:00:00 | 09/14/2012 11:29:02 | 142,328 | 0 | 0 |
| HQBESSQL | 1 | 1 | 0 | 0 | 0 | 0 | 0 | 0 | 0 | 0 | 27.10 GB | 0 | 09/14/2012 10:00:00 | 09/14/2012 11:07:42 | 109,167 | 0 | 0 |
| HQDC1 | 6 | 6 | 0 | 0 | 0 | 0 | 0 | 0 | 0 | 0 | 149.71 GB | 0 | 09/11/2012 10:00:00 | 09/17/2012 10:08:12 | 126,751 | 0 | 0 |
| HQDC2 | 6 | 6 | 0 | 0 | 0 | 0 | 0 | 0 | 0 | 0 | 23.68 GB | 0 | 09/11/2012 10:00:02 | 09/17/2012 10:08:32 | 97,739 | 0 | 0 |
| HQDEVAPP | 1 | 1 | 0 | 0 | 0 | 0 | 0 | 0 | 0 | 0 | 24.62 GB | 0 | 09/15/2012 10:00:00 | 09/15/2012 12:08:12 | 122,360 | 0 | 0 |
| HQDEVAPPSERVER | 1 | 1 | 0 | 0 | 0 | 0 | 0 | 0 | 0 | 0 | 50.00 GB | 0 | 09/15/2012 10:00:00 | 09/15/2012 12:53:32 | 97,167 | 0 | 0 |

AUTOMATIC IDENTIFICATION OF STORAGE REQUIREMENTS, SUCH AS FOR USE IN SELLING DATA STORAGE MANAGEMENT SOLUTIONS

CROSS-REFERENCE TO RELATED APPLICATION(S)

The present application claims priority to and the benefit of U.S. Provisional Application No. 61/746,239, filed Dec. 27, 2012, which is hereby incorporated herein by reference in its entirety.

BACKGROUND

Sales representatives for information management software products can face various challenges while trying to persuade a potential customer to purchase new products, such as upgrade from a competitor's existing information management product. Information management products provide information management services for information management systems. Information management systems organize and backup information, i.e., "production data", generated during the operation of client computing systems. Information management systems enable organizations to comply with data storage regulations and other business needs by providing retrievable copies, i.e., non-production or "secondary copies" of the production data for each client computing system. Because information management systems can play an important role within an organization, a sales representative may have various hurdles to overcome in order to successfully persuade a potential customer to switch to a different, and even better, information management product.

An example of a challenge that a sales representative for a information management product faces is that gathering information about the customer's existing information management system can be inconvenient and time consuming for the customer. Historically, sales representatives send a questionnaire to the customer. The questionnaires include questions like: how many client or server computing devices does the customer back up, what is the capacity of the storage devices for the client or server computing devices, what is the capacity of the storage devices used for storing the secondary copies, with what frequency does the customer create secondary copies. Having to obtain this information for a large computing system to the sales representative can be an big disincentive for a busy customer, even if the customer is unhappy with its existing information management solutions.

Another example of a challenge that the sales representative may have relates to customer concerns about how a replacement information management system would look and work with the customer's computing devices. Changing from a known system to an unknown system can be as scary or unnerving as transitioning from, for example, using an Apple operating system to using a Microsoft operating system. In other words, although the replacement information management system may perform similar (or better) functions as the existing product, fear of losing data or fear of operator error may cause a potential customer to hesitate or be reluctant to pursue an information management system upgrade.

Another example of a challenge that a the sales representative may have to overcome relates to customer concerns about overall cost of the upgrade. With any large and important purchase, various hidden costs arise. However, not knowing what hidden costs may be lurking behind a commitment may be an additional disincentive for a customer to pursue a new or replacement information management product.

The need exists for systems and methods that overcome the above problems, as well as systems and methods that provide additional benefits. Overall, the examples herein of some prior or related systems and methods and their associated limitations are intended to be illustrative and not exclusive. Other limitations of existing or prior systems and methods will become apparent to those of skill in the art upon reading the following Detailed Description.

BRIEF DESCRIPTION OF THE DRAWINGS

FIGS. 12A-12B are diagrams illustrating aspects of a license summary report.

FIGS. 13A-13B are diagrams illustrating aspects of a backup jobs summary report.

DETAILED DESCRIPTION

Figure 1:
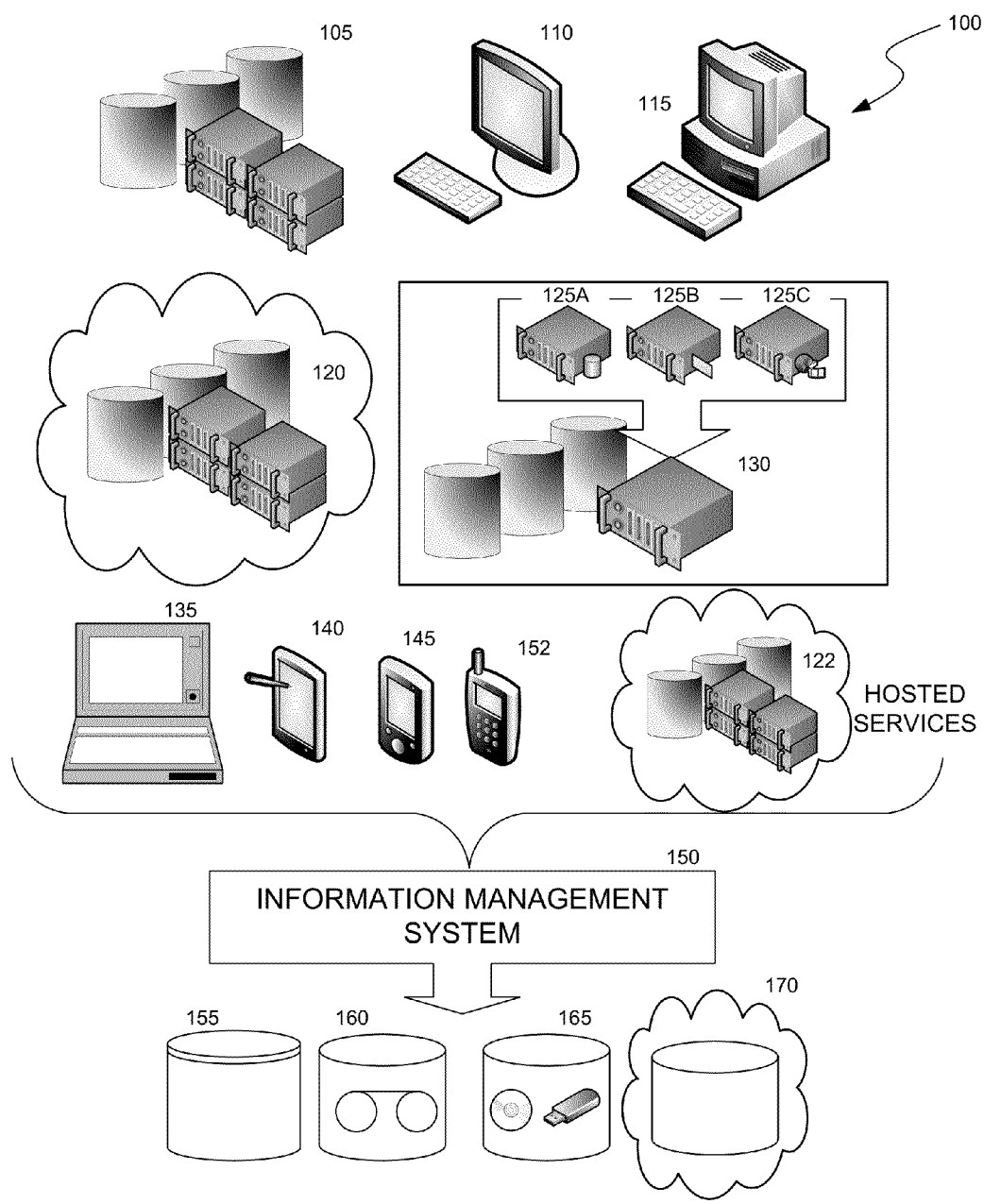
FIG. 1 is a block diagram illustrating an example of a suitable information management environment in which aspects of the inventive system may operate.

The techniques disclosed in this document are useful, in one aspect, in solving the above-discussed problems.

The headings provided herein are for convenience only and do not necessarily affect the scope or meaning of the disclosure.

Overview

Disclosed are systems and methods for using a discovery agent to analyze a potential customer's computing system, such as by using information from an existing information management software product in use by the potential customer. The discovery agent is a software tool that can be installed on the potential customer's system manager and that can leverage information generated by the existing product. The discovery agent uses information from the existing product to analyze and inventory the customer's computing system resources. The agent can upload the system resource information to an information management simulator to enable the customer to experience the look and feel of the replacement information management product while loaded with the customer's software and hardware resources. The information management simulator may be hosted remotely, for example, at the facilities of a sales representative.

The discovery agent may also display a list of recommended software and/or hardware resources to support an upgrade to the replacement information management software product. The discovery agent may display an overall price sheet for the upgrade, like an online shopping cart. The sales representative is thus able to quickly provide the customer with an inventory of the existing system and provide a list of additional resources, i.e., the shopping list, that are recommended to support the installation of the replacement information management product. Advantageously, by executing the discovery agent, the customer does not have to spend time taking inventory of its system, the customer can try out a simulation of the replacement system, and the customer can see any additional costs associated with the upgrade, before committing to the upgrade. The discovery agent also facilitates the installation of the new information management software, if the customer chooses to proceed with the installation. These advantages may increase the likelihood of closing the sale.

In some implementations of the systems and methods, an existing information management product is not in use by the customer or cannot be leveraged to inventory the customer's computing system. In these implementations, the discovery agent crawls or searches through the customer's computing system to identify the computing devices of the customer's system. Automating this process saves the customer the time and effort associated with taking inventory of its computing system. The discovery agent may then upload the identified computing devices, or other resources, to simulate the customer's computing system with a new information management software product. The discovery agent also facilitates the installation of the new information management software, if the customer chooses to proceed with the installation.

The discovery agent generates reports to assist the customer in transitioning to the new information management environment, i.e., software, hardware, and operation of the information management system. The discovery agent generates reports such as a license summary report and a backup jobs summary report. The reports enable the customer to, at-a-glance, see how many licenses are in use and see which jobs or clients have backups that are failing.

FIGS. 1-4 disclose foundational components and elements of an information management system and information management cell to which a customer's computing system may be upgraded. FIGS. 5-11 illustrate systems and methods of discovering resources, displaying resource lists, and upgrading an information management system for a customer. FIGS. 12-13 illustrate example reports that the discovery agent or replacement information management software may generate for the customer.

Various examples of the systems and methods will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Information Management Environment

Aspects of the technologies described herein may be practiced in an information management environment 100, which will now be described while referencing FIG. 1. Aspects of the information management environment 100 may be used to upgrade or replace an existing information management system of a customer. As shown in FIG. 1, the environment 100 includes multiple computing devices that execute numerous software applications to facilitate the operations of an organization (or multiple affiliated organizations), such as a household, corporation or other business entity, a non-profit organization, an educational institution, or a governmental agency. The computing devices may include one or more: servers 105 (such as mail servers, file servers, database servers, print servers, and web servers), personal computers 110, workstations 115, or other types of fixed computing systems such as mainframe computers and minicomputers (not shown). The servers 105 may include network-attached storage (NAS) filers.

The environment 100 may include virtualized computing resources, such as a virtual machine 120 provided to the organization by a third-party cloud service vendor or a virtual machine 125 running on a virtual machine host 130 operated by the organization. For example, the organization may use one virtual machine 125A as a database server and another virtual machine 125B as a mail server. The environment 100 may also include mobile or portable computing devices, such as laptops 135, tablet computers 140, personal data assistants 145, mobile phones 152 (such as smartphones), and other mobile or portable computing devices such as embedded computers, set top boxes, vehicle-mounted devices, wearable computers, etc.

Of course, other types of computing devices may form part of the environment 100. As part of their function, each of these computing devices creates, accesses, modifies, writes, and otherwise uses production copies of data and metadata that are typically stored in a persistent storage medium having fast I/O times. For example, each computing device may regularly access and modify data files and metadata stored on semiconductor memory, a local disk drive or a network-attached storage device. Each of these computing devices may access data and metadata via a file system supported by an operating system of the computing device.

The environment 100 may also include hosted services 122 that provide various online services to the organization or its constituent members (e.g., the organization's departments, employees, independent contractors, etc.) such as social networking services (e.g., Facebook, Twitter, Pinterest), hosted email services (e.g., Gmail, Yahoo Mail, Hotmail), or hosted productivity applications or other hosted applications (e.g., Microsoft Office 365, Google Docs, Salesforce.com). Hosted services may include software-as-a-service (SaaS), platform-as-a-service (PaaS), application service providers (ASPs), cloud services, and all manner of delivering computing or functionality via a network. As it provides services to users, each hosted service may generate additional "hosted data and metadata" that is associated with each user. For example, Facebook may generate and store photos, wall posts, notes, videos, and other content that are associated with a particular Facebook user's account.

The organization directly or indirectly employs an information management system 150 to protect and manage the data and metadata used by the various computing devices in the environment 100 and the data and metadata that is maintained by hosted services on behalf of users associated with the organization. One example of an information management system is the CommVault Simpana system, available from CommVault Systems, Inc. of Oceanport, N.J. The information management system creates and manages non-production copies of the data and metadata to meet information management goals, such as: permitting the organization to restore data, metadata or both data and metadata if an original copy of the data/metadata is lost (e.g., by deletion, corruption, or disaster, or because of a service interruption by a hosted service); allowing data to be recovered from a previous time; complying with regulatory data retention and electronic discovery ("e-discovery") requirements; reducing the amount of data storage media used; facilitating data organization and search; improving user access to data files across multiple computing devices and/or hosted services; and implementing information lifecycle management ("ILM") or other data retention policies for the organization. The information management system 150 may create the additional non-production copies of the data and metadata on any suitable non-production storage medium such as magnetic disks 155, magnetic tapes 160, other storage media 165 such as solid-state storage devices or optical disks, or on cloud data storage sites 170 (e.g. those operated by third-party vendors). Further details on the information management system may be found in the assignee's U.S. patent application Ser. No. 12/751,850, filed Mar. 31, 2010 entitled DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES, now U.S. Pat. No. 8,285,681, which is hereby incorporated herein by reference in its entirety.

Figure 2:
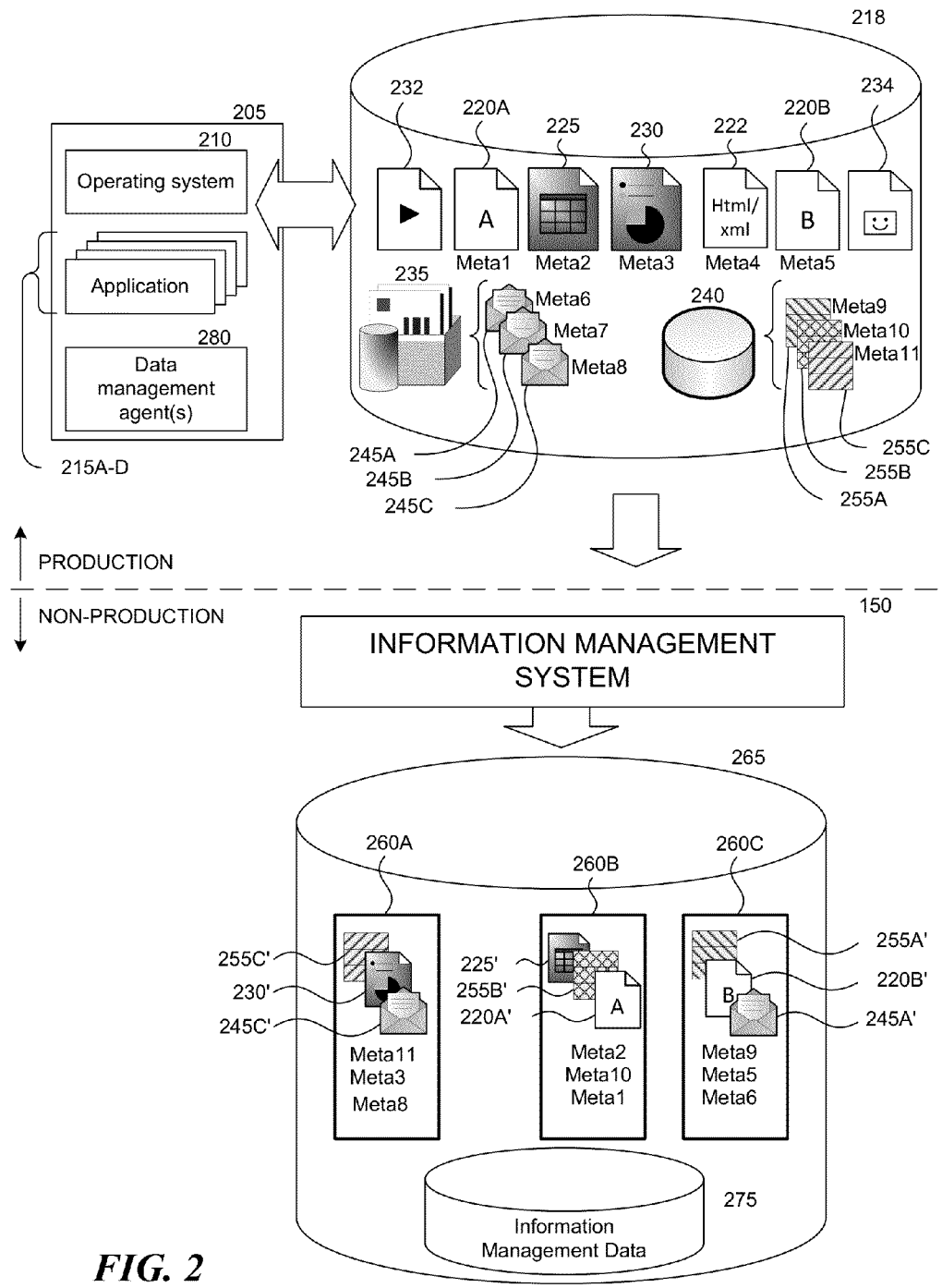
FIG. 2 illustrates examples of production and non-production data that may be processed by the information management environment of FIG. 1.

FIG. 2 helps illustrates some differences between "production copies" of data and metadata and "non-production copies" of data and metadata in the data management environment 100. As shown, each computing device 205 in the environment 100 has at least one operating system 210 installed and one or more applications 215A-D, such as mail server applications, file server applications, mail client applications, database applications, word processing applications, spreadsheet applications, presentation applications, browser applications, mobile applications, entertainment applications, and so on. Each application can access and modify various production copies of files stored in a production data storage medium 218, which may be a network attached storage filer or form part of a Hadoop distributed file system, Open VMS file system, or other type of distributed file system, simply by making conventional file system calls via the operating system 210, without needing the information management system 150 to intervene on behalf of the operating system or application. The production copies of files may include structured data (e.g., database files), unstructured data (e.g., documents), and/or semi-structured data, and thus may include one or more documents 220A-B, spreadsheets 225, presentation documents 230, video files 232, image files 234, email mailboxes 235, html/xml or other types of markup language files 222, and/or databases 240. The operating system 210 may also access and modify production copies of files and other data, such as files in a system volume and/or boot volume. The hosted data and metadata used by a hosted service are also "production copies" of data and metadata since the hosted service accesses and modifies the user's data and metadata as part of its services. Production copies of data may include not only files, but also subsets of files, each of which a related application 215 or the operating system 210 treats as an independent functional unit, but which is not separately addressed in the associated file system. For example, a single email mailbox 235 may include multiple email messages 245A-C, email headers, and attachments. As another example, a single database 240 may include multiple tables 255A-C. As used herein, a "data object" refers to both (1) any file that is currently or previously addressable by a file system and (2) a functional subset of such a file that has a particular function for a related application 215A-D or the operating system 210. Each data object may be further decomposed into one or more data blocks each of which is a collection of data bits within the data object that may not have any particular function for a related application or the operating system. In addition to data objects, the operating system 210 and applications 215A-D may also access and modify production copies of metadata, such as boot sectors, partition layouts, file or data object metadata (e.g., file name, file size, creation/modification/access timestamps, file location within a file folder directory structure, user permissions, owners, groups, access control lists ("ACLs")), and system metadata (e.g., registry information). In addition to metadata generated by or related to file systems and operating systems, some applications maintain indices of production metadata for data objects, e.g., metadata associated with individual email messages. Thus, as shown in FIG. 2, each data object may be associated with a production copy of object metadata ("Meta1-11"), which may be file system metadata and/or application-specific metadata.

The information management system 150 accesses or receives copies of the various production copies of data objects and metadata, and via an information management operation (such as a backup operation, archive operation, or snapshot operation), creates non-production copies of these data objects and metadata, often stored in one or more non-production storage mediums 265 different than the production storage medium 218 where the production copies of the data objects and metadata reside. A non-production copy of a data object represents the production data object and its associated metadata at a particular point in time (non-production objects 260A-C). Since a production copy of a data object or metadata changes over time as it is modified by an application 215, hosted service 122, or the operating system 210, the information management system 150 may create and manage multiple non-production copies of a particular data object or metadata, each representing the state of the production data object or metadata at a particular point in time. Moreover, since a production copy of a data object may eventually be deleted from the production data storage medium and the file system from which it originated, the information management system may continue to manage point-in-time representations of that data object, even though a production copy of the data object itself no longer exists.

For virtualized computing devices, such as virtual machines, the operating system 210 and applications 215A-D may be running on top of virtualization software, and the production data storage medium 218 may be a virtual disk created on a physical medium such as a physical disk. The information management system may create non-production copies of the discrete data objects stored in a virtual disk file (e.g., documents, email mailboxes, and spreadsheets) and/or non-production copies of the entire virtual disk file itself (e.g., a non-production copy of an entire .vmdk file).

Each non-production object 260A-C may contain copies of or otherwise represent more than one production data object. For example, non-production object 260A represents three separate production data objects 255C, 230 and 245C (represented as 245C', 230' and 245', respectively). Moreover, as indicated by the prime mark ('), a non-production object may store a representation of a production data object or metadata differently than the original format of the data object or metadata, e.g., in a compressed, encrypted, deduplicated, or otherwise optimized format. Although FIG. 2 shows that a single production data object (e.g., 255C), and its associated data object metadata (e.g., Meta11) are represented by the contents of only a single non-production object (e.g., 260A), the entire contents of a single production data object and/or its metadata at a particular point in time may instead span across numerous non-production objects. Also a single non-production object 260 may contain copies of or otherwise represent production data objects that originated from different computing devices.

Non-production copies include backup copies, archive copies, and snapshot copies. Backup copies are generally used for shorter-term data protection and restoration purposes and may be in a native application format or in a non-native format (e.g., compressed, encrypted, deduplicated, and/or otherwise modified from the original application format). Archive copies are generally used for long-term data storage purposes and may be compressed, encrypted, deduplicated and/or otherwise modified from the original application format. In some examples, when an archive copy of a data object is made, a logical reference or stub may be used to replace the production copy of the data object in the production storage medium 218. In such examples, the stub may point to or otherwise reference the archive copy of the data object stored in the non-production storage medium so that the information management system can retrieve the archive copy if needed. The stub may also include some metadata associated with the data object, so that a file system and/or application can provide some information about the data object and/or a limited-functionality version (e.g., a preview) of the data object. A snapshot copy represents a data object at a particular point in time. A snapshot copy can be made quickly and without significantly impacting production computing resources because large amounts of data need not be copied or moved. A snapshot copy may include a set of pointers derived from the file system or an application, where each pointer points to a respective stored data block, so collectively, the set of pointers reflect the storage location and state of the data object at a particular point in time when the snapshot copy was created. In "copy-on-write", if a block of data is to be deleted or changed, the snapshot process writes the block to a particular data storage location, and the pointer for that block is now directed to that particular location. The set of pointers and/or the set of blocks pointed to by a snapshot may be stored within the production data storage medium 218.

Non-production copies of a data object or metadata may be distinguished from a production copy of a data object or metadata in several ways. First, a non-production copy of a data object is created to meet the different information management goals described above and is not directly used or modified by applications 215A-D, hosted services 122, or the operating system 210. Second, a non-production copy of a data object is stored as one or more non-production objects 260 that may have a format different from the native application format of the production copy of the data object, and thus often cannot be directly used by the native application or a hosted service 122 without first being modified. Third, non-production objects are often stored on a non-production storage medium 265 that is inaccessible to the applications 215A-D running on computing devices and hosted services 122. Also, some non-production copies may be "offline copies," in that they are not readily available (e.g. not mounted tape or disk.) Offline copies include copies of data that the information management system can access without any human intervention (e.g. tapes within an automated tape library, but not yet mounted in a drive), and copies that the information management system 150 can access only with at least some human intervention (e.g. tapes located at an offsite storage site).

The information management system 150 also generates information management data 275, such as indexing information, that permit the information management system to perform its various information management tasks. As shown in FIG. 2, a computing device 205 may include one or more data management agents 280 that provide client-side functions for the information management system.

Information Management System

Figure 3:
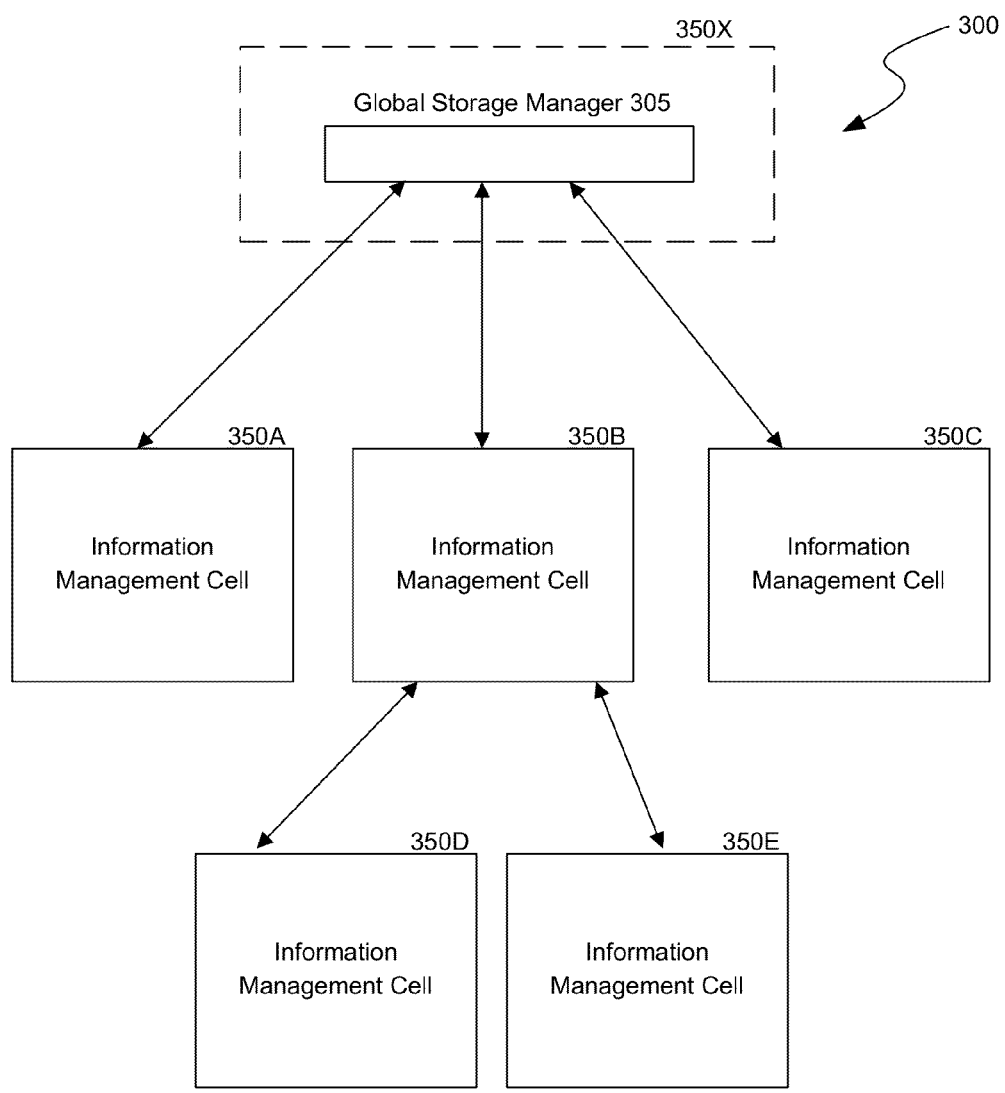
FIG. 3 is a block diagram illustrating one example of a hierarchical arrangement of resources for the information management system of FIG. 1, including information management cells.

FIG. 3 shows a hierarchical arrangement of resources that may form an information management system 150. As shown, the information management system 150 includes multiple information management cells 350 arranged in a hierarchy, with some information management cells (e.g., 350D-E) subordinate to other information management cells (e.g., 350B). A global storage manager 305, which may form part of a global information cell 350x, manages the overall hierarchy of information management cells by receiving reports from the various subordinate information management cells related to the operation of the cells, determining global information management policies in light of received reports, and pushing information management policies towards subordinate cells for implementation. The global storage manager may also maintain and disseminate, to the various cells, system-wide information management data. A superior information management cell (e.g., 350B), may perform similar tasks for its subordinate cells (e.g., 350D-E) and/or otherwise act as an intermediary between the subordinate cells and the global storage manager 305.

Information Management Cell

Figure 4:
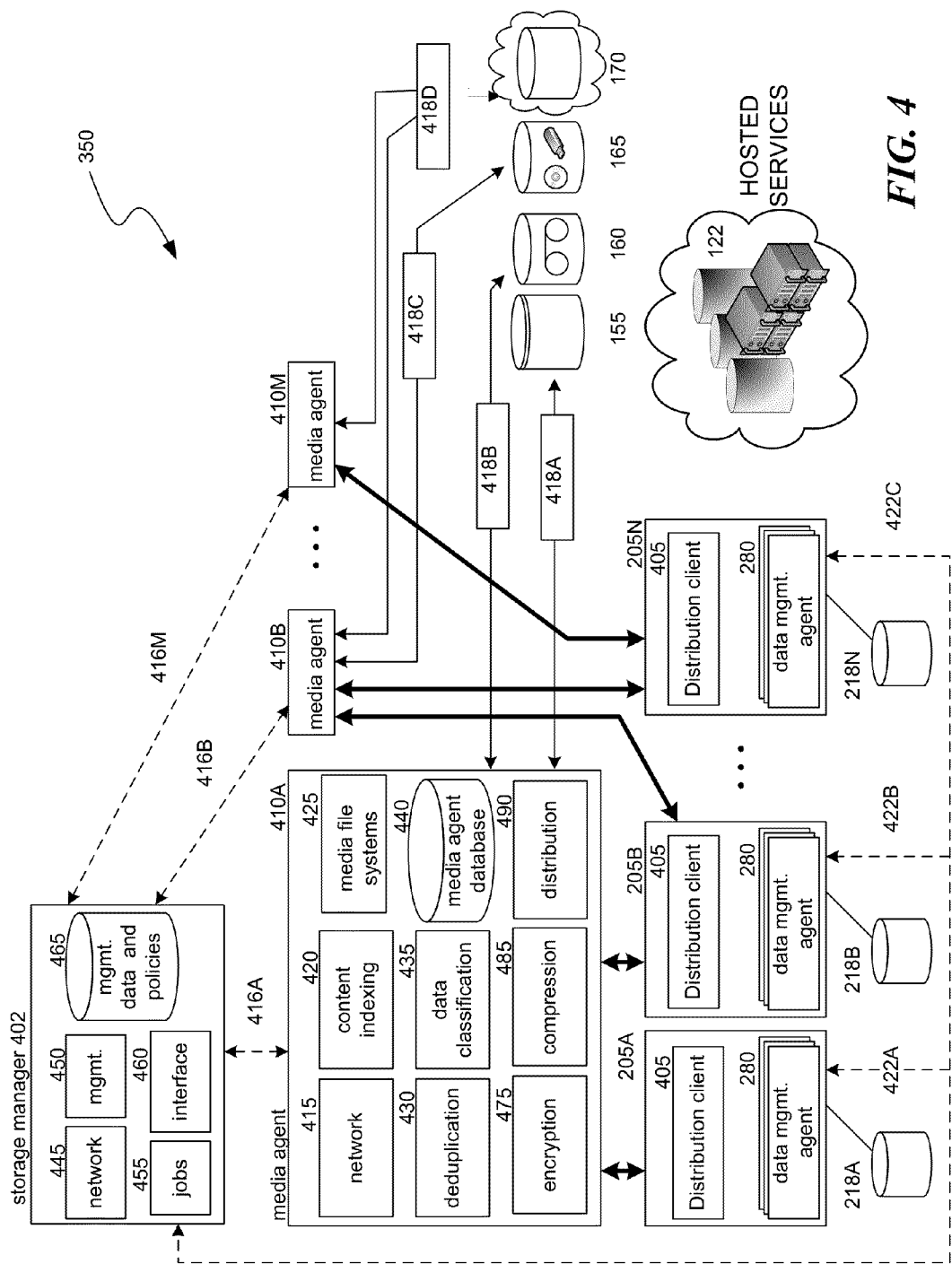
FIG. 4 is a block diagram illustrating an example of resources forming an information management cell.

FIG. 4 shows an arrangement of resources that may be used to replace existing information management software and that may form an information management cell 350. As shown, the information management cell includes a storage manager 402, one or more media agents 410A-M, one or more non-production storage mediums 155-170, one or more computing devices 205A-N, and one or more production data storage mediums 218A-N. Outside of the information management cell are hosted services 122, which may interact with media agents 410 and its components, as described further herein. In some examples, all or a portion of an information management cell may be implemented as an object store, as described in assignee's U.S. patent application Ser. No. 12/751,850 (introduced above).

The storage manager 402 may be a software module or other application that coordinates and controls information management operations performed by one or more information management cells 350 to protect and control copies of non-production data objects and metadata. As shown by the dashed lines 416 and 422, the storage manager may communicate with some or all elements of the information management cell 350, such as the media agents 410 and computing devices 205, to initiate and manage backup operations, snapshot operations, archive operations, data replication operations, data migrations, data distributions, data recovery, and other information management operations. The storage manager may control additional information management operations including ILM, deduplication, content indexing, data classification, data mining or searching, e-discovery management, collaborative searching, encryption, and compression. Alternatively or additionally, a storage manager may control the creation and management of disaster recovery copies, which are often created as secondary, high-availability disk copies, using auxiliary copy or replication technologies.

The storage manager 402 may include a jobs agent 455, a management agent 450, a network agent 445, and an interface agent 460, all of which may be implemented as interconnected software modules or application programs. The jobs agent 455 monitors the status of information management operations previously performed, currently being performed, or scheduled to be performed by the information management cell 350. The management agent 450 provides an interface that allows various management agents 450 in multiple information management cells 350 (or in a global storage manager 305) to communicate with one another. This allows each information management cell 350 to exchange status information, routing information, capacity and utilization information, and information management operation instructions or policies with other cells. In general, the network agent 445 provides the storage manager 402 with the ability to communicate with other components within the information management cell and the larger information management system, e.g., via proprietary or non-proprietary network protocols and application programming interfaces ("APIs") (including HTTP, HTTPS, FTP, REST, virtualization software APIs, cloud service provider APIs, hosted service provider APIs). The interface agent 460 includes information processing and display software, such as a graphical user interface ("GUI"), an API, or other interactive interface through which users and system processes can retrieve information about the status of information management operations or issue instructions to the information management cell and its constituent components. The storage manager 402 may also track information that permits it to select, designate, or otherwise identify content indices, deduplication databases, or similar databases within its information management cell (or another cell) to be searched in response to certain queries.

The storage manager 402 may also maintain information management data, such as a database 465 of management data and policies. The database 465 may include a management index that stores logical associations between components of the system, user preferences, user profiles (that among other things, map particular information management users to computing devices or hosted services), management tasks, or other useful data. The database 465 may also include various "information management policies," which are generally data structures or other information sources that each include a set of criteria and rules associated with performing an information management operation. The criteria may be used to determine which rules apply to a particular data object, system component, or information management operation, an may include:
frequency with which a production or non-production copy of a data object or metadata has been or is predicted to be used, accessed, or modified;
access control lists or other security information;
the sensitivity (e.g., confidentiality) of a data object as determined by its content and/or metadata;
time-related factors;
deduplication information;
the computing device, hosted service, computing process, or user that created, modified, or accessed a production copy of a data object; and
an estimated or historic usage or cost associated with different components.
The rules may specify, among other things:
a schedule for performing information management operations,
a location (or a class or quality of storage media) for storing a non-production copy,
preferences regarding the encryption, compression, or deduplication of a non-production copy,
resource allocation between different computing devices or other system components (e.g., bandwidth, storage capacity),
whether and how to synchronize or otherwise distribute files or other data objects across multiple computing devices or hosted services,
network pathways and components to utilize (e.g., to transfer data) during an information management operation, and
retention policies (e.g., the length of time a non-production copy should be retained in a particular class of storage media).

As noted above, each computing device 205 may include one or more data management agents 280. Each data management agent 280 is a software module or component that helps govern communications with other system components. For example, the data management agent receives commands from the storage manager 402 and sends to and receives from media agents 410 copies of data objects, metadata, and other payload (as indicated by the heavy arrows). Each data management agent accesses data and/or metadata stored in a production data storage medium 218 and arranges or packs the data and metadata in a certain format (e.g., backup or archive format) before it is transferred to another component. Each data management agent can also restore a production copy of a data object or metadata in a production data storage medium 218 from a non-production copy. A data management agent may perform some functions provided by a media agent, which are described further herein, such as compression, encryption, or deduplication. Each data management agent may be specialized for a particular application (e.g. a specified data management agent customized to handle data generated or used by Exchange by Microsoft Corp.). Alternatively or additionally, a more generic data management agent may handle data generated or used by two or more applications.

Each computing device 205 may also include a data distribution and live browsing client module 405 (herein "distribution client module"). The distribution client module 405 is responsible for, inter alia, associating mobile devices and/or hosted service accounts with users of the information management system, setting information management policies for mobile and other computing devices, pushing data objects to a distribution module for distribution to other computing devices, providing unified access to a user's data via an interface, and providing live browsing features. The various functions of the distribution client module are described in greater detail herein.

A media agent 410, which may be implemented as a software module, conveys data, as directed by the storage manager 402, between a computing device 205 (or hosted service 122) and one or more non-production storage mediums 155-170. Each media agent 410 may control one or more intermediary storage devices 418, such as a cloud server or a tape or magnetic disk library management system, to read, write, or otherwise manipulate data stored in a non-production storage medium 155-170. Each media agent 410 may be considered to be "associated with" a storage device and its related non-production storage media if that media agent is capable of routing data to and storing data in the storage media managed by the particular storage device. A media agent may communicate with computing devices 205, hosted services 122, storage devices 418A-D, and the storage manager 402 via any suitable communications path, including SCSI, a Storage Area Network ("SAN"), a Fibre Channel communications link, or a wired, wireless, or partially wired/wireless computer or telecommunications network, including the Internet.

To perform its functions, the media agent 410 may include a media file system module 425, a data classification module 435, a content indexing module 420, a deduplication module 430, an encryption module 475, a compression module 485, a network module 415, a distribution module 490, and a media agent database 440. The media file system module 425 is responsible for reading, writing, archiving, copying, migrating, restoring, accessing, moving, sparsifying, deleting, sanitizing, destroying, or otherwise performing file system operations on various non-production storage devices of disparate types. The media file system module may also instruct the storage device to use a robotic arm or other retrieval means to load or eject certain storage media such as a tape.

The network module 415 permits the media agent to communicate with other components within the system and hosted services 122 via one or more proprietary and/or non-proprietary network protocols or APIs (including cloud service provider APIs, virtual machine management APIs, and hosted service provider APIs). The deduplication module 430 performs deduplication of data objects and/or data blocks to reduce data redundancy in the cell. The deduplication module may generate and store data structures to manage deduplicated data objects, such as deduplication tables, in the media agent database 440. The encryption module 475 performs encryption of data objects, data blocks, or non-production objects to ensure data security in the cell. The compression module 485 performs compression of data objects, data blocks, or non-production objects to reduce the data capacity needed in the cell.

The content indexing module 420 analyzes the contents of production copies or non-production copies of data objects and/or their associated metadata and catalogues the results of this analysis, along with the storage locations of (or references to) the production or non-production copies, in a content index stored within a media agent database 440. The results may also be stored elsewhere in the system, e.g., in the storage manager 402, along with a non-production copy of the data objects, and/or an index cache. Such index data provides the media agent 410 or another device with an efficient mechanism for locating production copies and/or non-production copies of data objects that match particular criteria. The index data or other analyses of data objects or metadata may also be used by the data classification module 435 to associate data objects with classification identifiers (such as classification tags) in the media agent database 440 (or other indices) to facilitate information management policies and searches of stored data objects.

The distribution module 490 may be a set of instructions that coordinates the distribution of data objects and indices of data objects. The distribution may occur from one computing device 205 to another computing device 205 and/or from hosted services 122 to computing devices 205. As a first example, the distribution module may collect and manage data and metadata from hosted services 122 or mobile devices 205. As another example, the distribution module may synchronize data files or other data objects that are modified on one computing device so that the same modified files or objects are available on another computing device. As yet another example, the distribution module may distribute indices of data objects that originated from multiple computing devices and/or hosted services, so a user can access all of their data objects through a unified user interface or a native application on their computing device. The distribution module may also initiate "live browse" sessions to permit communications between different computing devices so that the devices can interchange data and metadata or so the devices can provide computing resources, such as applications, to each other. The functions performed by the distribution module are described in greater detail herein.

Resource Identification Using Existing Software Products

As described in the Background and Overview sections, a sales representative for new or for replacement information management software may have a few hurdles to overcome while attempting to persuade a customer to upgrade to a replacement information management software product. Traditionally, a sales representative solicits a customer to fill out a paper or electronic questionnaire to provide a list of software and hardware resources within the customer's computing system. The time and effort consumed by gathering the requested information and providing the requested information to the sales representative is a disincentive for the customer to pursue the sales representative's product. Even if the customer is willing to provide an inventory of its existing system, concerns over hidden costs and undisclosed fees can be another disincentive to change or upgrade to another information management product. Furthermore, if the customer does commit to upgrading to the new information management product, the customer may then be faced with the time commitment associated with installing tens or hundreds of copies of software products. A discover agent disclosed herein addresses and solves each of these potential issues or disincentives that a customer may face.

Figure 5:
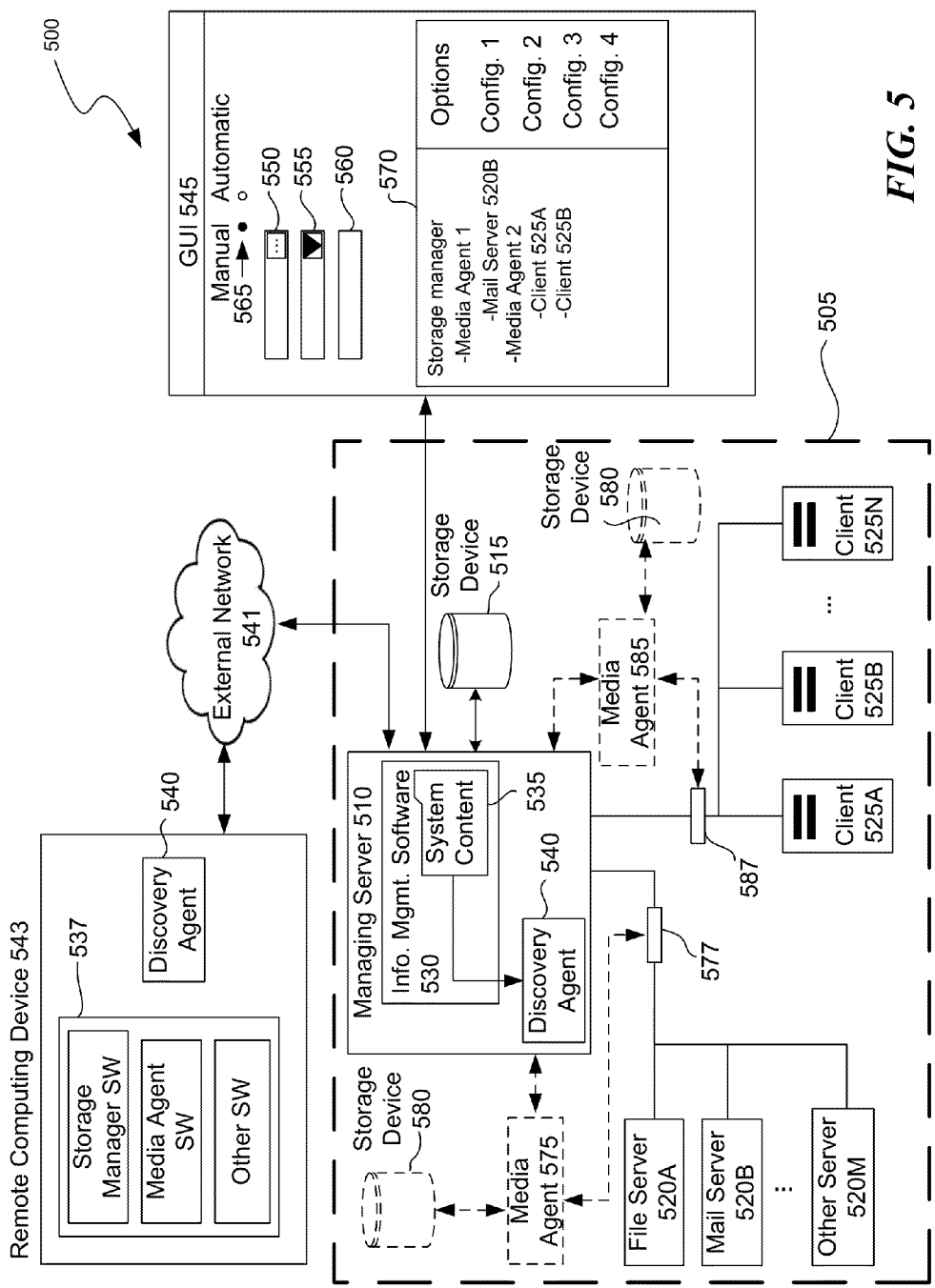
FIG. 5 is a block diagram illustrating an example of analyzing a computing system to upgrade an existing information management system.

FIG. 5 illustrates a computing environment 500 having an existing information management software product in a customer's computing system 505. The computing system 505 may include a managing server 510, a storage device 515, servers 520, and client computing devices 525. The managing server 510 may use the storage device 515 to store information associated with the managing server 510 and/or may use the storage device 515 to store secondary copies of data for the servers 520 and the client computing devices 525. The servers 520 may include any number of servers and various types of servers. For example, the servers 520 may include a file server 520A, a mail server 520B, and one or more other servers 520M. The client computing devices 525 may include any number of client computing devices, represented by a client computing device 525A, a client computing device 525B, and a client computing device 520N.

The computing system 505 may receive information management services from an existing information management software 530. The computing system 505 combined with the existing information management software 530 may be hereafter referred to as an "existing information management system." The existing information management software may be a competitor to the replacement information management software product demonstrated by the sales representative and described in FIGS. 1-4, though it could also be an upgrade for an existing product demonstrated by the sales representative. The replacement (or upgrade) information management software 537 may reside on a remote computing device 543 and be available for download via external network 541. Examples of information management systems are Simpana® software by CommVault®, Networker® software by EMC²®, NetBackup™ software by Symantec™, Tivoli Storage Manager FastBack® software by IBM®, and the like. The existing information management software 530 may cause the managing server 510 to provide data storage services for the computing system 505.

The existing information management software 530 may use one or more system content files 535 to manage the computing system 505. The system content file 535 may include identification of each of the computing devices, e.g., the servers 520 and the clients 525, serviced by the information management software 530. The system content file 535 may also include a mapping between the servers 520, the client computing devices 525, and locations in memory, e.g., in the storage device 515, where secondary copies of data are stored for both the servers 520 and the client computing devices 525. The information management software 530 may use the system content file 535 to maintain a list of computing devices within the computing system 505, as well as to maintain a record of the system roles or functions associated with those computing devices.

A sales representative may install a discovery agent 540 to showcase or demonstrate the features of a replacement information management software 537, e.g. CommVault® software and/or configurations of FIGS. 1-4, for the existing information management software. In some implementations, the replacement software 537 includes the software modules and agents described in the information management cell 350 (shown in FIGS. 3-4).

The sales representative or customer installs the discovery agent 540 on the managing server 510. The managing server 510 is the computing device connected to manage and to interface with the various components and devices of the computing system 505. By installing the discovery agent 540 on the managing server 510, the discovery agent 540 may communicate with all devices within the computing system 505. The sales representative or customer may install the discovery agent 540 using one or more of a variety of computer-readable media. In some implementations, the discovery agent 540 is installed using a CD, a DVD, a USB drive, or the like. In other implementations, the discovery agent 540 is installed over the external network 541 from the remote computing device 543.

The discovery agent 540 leverages the installation of the existing information management software 530 to acquire information about the computing system 505. The information management software 530 may store names, network addresses, capacity information, and other information about the servers 520 and the client computing devices 525 in the system content file 535. The discovery agent 540 can use the information stored in the system content file 535 to run simulations of the replacement software 537. However, the discovery agent locates the system content file 535 before extracting information from the file.

The discovery agent 540 may automatically locate the system content file 535 by searching through predetermined file system paths. The system content file 535 is typically installed at a predefined path or location in the file system of the managing server 510. Manufacturers of information management software 530 store the system content file 535 in a particular location to make it easy for subsequent software releases to find the file without extensive searching of the managing server 530. Example file system paths for the system content file 535 of various manufacturers of information management software 530 is provided below in Table 1.

TABLE 1

| Manufacturer | System Content File Path |
|---|---|
| Symantec ™ | C:\NetBackup\bin\sys_content_file.db |
| EMC² ® | C:\Networker\masterserver\sys_content_file.db |
| IBM ® | C:\Program Files\tivoli\tsmn\sys_content_file.db |

The discovery agent 540 may automatically locate the system content file 535, or it may receive instructions from the customer, or other user, through a graphical user interface (GUI) 545. GUI 545 may include a browse button 550, a drop down menu 555, or a file path list box 560 for receiving instructions from the customer. The GUI 545 may also include radio buttons 565 to enable the customer to select between having the discovery agent 545 manually or automatically locate the system content file 535. The manual option may enable the customer to locate the system content file 535, even when the file is stored remotely from the managing server 510, e.g. on a network attached storage (NAS).

The discovery agent 540 parses and analyze the content of the system content file 535 before displaying the content with the GUI 545. The system content file 535 may be a data structure such as a table or a database. In some implementations, system content file 535 may be arranged according to Table 2, as shown below.

TABLE 2

| Resource ID | Type | Network Addr. | BU Copy Storage Location | Capacity |
|---|---|---|---|---|
| CD 525A | Client | 10.108.1.123 | N:\client1\bu | 50 GB |
| CD 525N | Client | 10.108.1.2 | N:\client14\bu | 110 GB |
| SVR 520B | Server | 10.108.1.245 | N:\server2\bu | 1 TB |
| MS-Exchng | Agent | N/A | N:\msexchange\bu | N/A |

The system content file 535 identifies both hardware and software resources for the existing information management system. Table 2 includes columns for resource ID, resource type, network address, the storage location of backup copies for the resources, and the respective storage capacity of each of the hardware resources. Table 2 is provided for illustration purposes and may include more or less columns than are shown. As shown, Table 2 includes example entries for client computing device 525A, client computing device 525N, mail server 525B, and a MS-Exchange data agent. The first row of Table 2 indicates that device ID 525A is a client computing device having a storage capacity of 50 GB and a network address of 10.108.1.123. Table 2 also indicates that backup copies for device ID 525A are stored at location N:\client1\bu, which may be a location on the storage device 515. By extracting the information in the system content file 535 that is associated with the resources of computing system 505, the discovery agent can provide information that is useful for enabling a sales representative to show the customer how the replacement information management software 537 would work on the computing system 505, prior to the customer purchasing and fully installing the replacement information management software 537.

After extracting resource information from the system content file 535, the discovery agent 540 may display the resources for the user, using the GUI 545. In one implementation, the discovery agent 540 displays the extracted information in the same format shown in Table 2, to allow the sales representative and customer to take inventory of the computing system 505. The GUI 545 also enables the customer to deselect or delete resources from the list, such as computing devices that are no longer in use or that no longer benefit from information management system support; or conversely, may add resources that may be added to the system.

The discovery agent 540 may use the GUI 545 to simulate a user interface 570 of the replacement information management software 537. The discovery agent 540 loads the information for the resources of the computing system 505 into a version of the replacement information management software 537 that is installed on the managing server 510. While some of the resources of the computing system 505 include computing devices such as servers 520 and clients 525, the computing system 505 may also include software resources such as MS-Exchange-Server, MS-SharePoint, and Oracle. The simulation of the replacement information management software 537 renames and organizes the resources of the existing information management software 530 into a system or format that is compatible with the operation of the replacement information management software 537. For example, the resources MS-Exchange-Server, MS-SharePoint, and Oracle may be organized as data agents and renamed as Exchange Database, SharePoint Database, and Oracle Database, respectively. The simulation of the information management software 537 may rename the managing server 510 as a storage manager and display the storage manager at the top of a hierarchy of resources in the simulation. Additionally, the simulation of the replacement information management software 537 may assign the servers 520 to be serviced by a simulated Media Agent 1 and may assign the clients computing devices 525 to be serviced by a simulated Media Agent 2, in accordance with a configuration used by the replacement information management software 537. Thus, the discovery agent 540 provides a simulated configuration of the replacement information software 537 using resources from the computing system 505 in order to enable a customer to experience the look and feel of various features of the replacement information software 537.

The discovery agent 540 determines the simulated configuration based on the characteristics of the computing devices, such as those shown in Table 2. For example, the discovery agent 540 may assign a media agent to a number of servers having a combined storage capacity that does not exceed a first threshold, e.g., 1 TB. The discovery agent 540 may assign a media agent to a number of client computing devices having a combined storage capacity that does not exceed a second threshold, e.g., 10 TB. The discovery agent 540 may allocate media agents based on the role and capacity of the computing devices because computing devices having more important roles, e.g., a server, may be backed up more frequently than computing devices with other roles, e.g., client computing device or workstation. Although example thresholds of 1 TB and 10 TB are used, the discovery agent 540 may receive adjustments to the thresholds or other characteristics of the computing devices. Adjustments to the thresholds or other characteristics may be received from the customer, or other user, via GUI 545.

The discovery agent 540 may also provide the customer with additional simulated configurations. As shown in window 570, discovery agent 540 may populate the GUI 545 with multiple optional configurations, such as configuration 1, configuration 2, configuration 3, and configuration 4. The GUI 545 may enable the customer, or other user, to select between one or more of the optional configurations to use for the simulation of the computing system 505. In some configurations, the simulated media agents are installed on simulated computing devices that are independent of the servers 520 and the client computing devices 525. In other configurations, the simulated media agents may be installed on one or more of the same computing devices used for the servers 520 and/or the client computing devices 525. In yet other configurations, the simulated media agents may be installed on the simulated storage manager, i.e., the managing server 510. The various optional configurations may also enable the sales representative to explain the benefits and drawbacks of the various configurations, such as speed, cost, and convenience of maintenance.

The discovery agent 540 may upload resource information for the computing system 505 to a remote computing device 543 to enable the remote computing device 543 to analyze the computing system 505 and to provide the simulated user interface 570. By analyzing the resources of the computing system 505 at the remote computing device 543 instead of with the managing server 510, features of the replacement information management software 537 can be accessed remotely by multiple computing systems, such as computing system 505, of one or more customers at multiple locations without having to repetitively install the software on local computing devices belonging to the customer(s). In some embodiments, the remote computing device 543 loads information about the resources of the computing system 505 into a virtually managed simulated information management system and sends an access code or a uniform resource locator (URL) to the customer to enable the customer to access the remote simulation.

The discovery agent 540 locally, or through the remote computing device 543, provides the customer, or other user, with a list of additional resources that are recommended for supporting the upgrade to the replacement information management software 537. Items on the list can be selectively added or removed from the list, like an online shopping cart. Referring briefly to software components illustrated in more detail in FIG. 4, the list of additional resources, i.e. the shopping cart, may include items such as those illustrated in Table 3, below. Table 3 includes a user-adjusted quantity,

TABLE 3

| Qty Adj. | Description | Recomm. Qty. | Price |
|---|---|---|---|
|  | Storage Manager SW | 1 | $2,000 |
|  | Media Agent SW | 2 | $3,000 |
|  | Data Agent SW | 4 | $3,600 |
| −2 | Distribution Clients SW | 70 | $21,000 |
|  | Media Agent Server | 2 | $4,000 |
|  | SAN Hard Drive | 2 | $2,000 |
| −1 | Tape Drive | 1 | $4,500 | resource description, recommended quantity, and license or hardware costs. As shown, examples of software resources and costs that may be recommended for addition to the computing system 505 during an information management system upgrade include storage manager software, media agent software, data agent software, and distribution client software. Examples of hardware resources that may be recommended for addition to the computing system 505 include media agent servers, storage area network hard drives, and tape drives. The storage manager software may include the agents and data structures described in association with storage manager 402 (shown in FIG. 4), such as the network agent 445, the management agent 450, the jobs agent 455, the interface agent 460, and the database 465. The media agent software may include the modules and data structures described in association with media agent 410A (also shown in FIG. 4), such as the network module 415, the content indexing module 420, the media file system module 425, the deduplication module 430, the data classification module 435, the media agent database 440, the encryption module 475, the compression module 485, and the distribution module 490. The data agent software of Table 3 may be the data management agent 280, and the distribution client software may be the distribution client 405 (both shown in FIG. 4). The discovery agent 540 may send the list of Table 3 to the customer via electronic mail, may post the list on an account page accessible by the customer via the Internet, or may display the list of Table 3 via GUI 545. By providing the customer with a detailed list or shopping cart of additional resources recommended to support the installation of the replacement information management system, the discovery agent 540 enables the customer to more easily discuss and plan for the upgrade with the leadership of his or her organization. The detailed list also enables the sales representative to evaluate and resolve any financial concerns that the customer might have regarding the installation.

The discovery agent 540 may facilitate the installation of the replacement information management software 537 by installing or instructing/managing installation of the various software modules and agents of information management cell 350 throughout the computing system 505. If the customer accepts the recommendations for additional hardware and software resources, e.g., from Table 3, the customer will modify the computing system 505 to also include a media agent server 575, a storage device 580, a media agent server 585, and a storage device 590. The media agent server 575 is communicatively coupled to the managing server 510 and coupled to the servers 520 via a router 577. The media agent server 585 is communicatively coupled to the managing server 510 and coupled to the client computing devices 525 via a router 587. The discovery agent 540 may then initiate, for example, the download and installation of storage manager software onto the management server 510, media agent software onto media agent servers 575 and 585, and the like. Upon completion of the installation, the managing server 510 may operate as a storage manager 402, and media agent servers 575 and 585 may operate as media agents 410A and 410B. The storage manager 510 and media agents 575 and 585 may then begin creating secondary copies of production data for the servers 520 and the client computing devices 525 on storage devices 580 and 590 using the techniques described for the information management cell 350 of FIG. 4. Furthermore, the storage manager 510 may begin managing secondary copies of data created with the previously used information management software.

In summary, the discovery agent 540 simplifies the transition for a customer from existing information management software to replacement information management software by analyzing files of the existing management software, simulating the replacement software, and installing the replacement software in response to instructions from a user. The discovery agent 540 leverages information stored by existing software to quickly identify and define existing resources of the computing system 505. The discovery agent 540 uses the identified resources of the computing system 505 to simulate a replacement information management system with the resources that the customer is already familiar with. Lastly, discovery agent 540 enables the distribution and installation of various software components from a remote computing device 543.

In the computing environment 500, the discovery agent 540 is described as a single piece of software. However, in some implementations, the discovery agent 540 includes uses several sub-components to perform its function.

Figure 6:
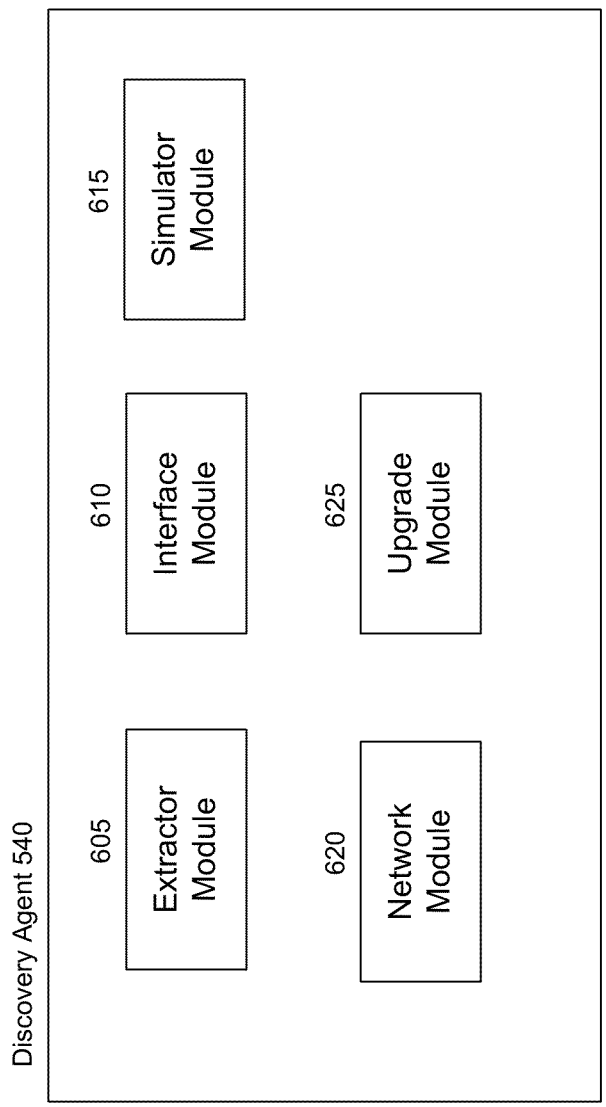
FIG. 6 is a block diagram illustrating an example of a discovery agent.

FIG. 6 illustrates that, in some implementations, the discovery agent 540 includes and uses various software modules to facilitate the analysis of the computing system 505 and to facilitate the installation of the replacement information management software 537. The discovery agent 540 may include an extractor module 605, an interface module 610, a simulator module 615, a network module 620, and an upgrade module 625. By making the discovery agent 540 modular, the manufacturer can update one or more portions of the discovery agent 540 to adapt to changes in communication protocols, updates to competitor (or other) software products, or changes to the replacement software product.

The discovery agent 540 uses the extractor module 605 to locate and analyze the content of an existing information management software, e.g., information management software 530. The extractor module 605 may include the file system paths of system content files for competitor information management system software products, e.g., Table 1. The manufacturer may periodically update the file system paths, e.g., C:\NetBackup\bin\sys_content_file.db, so that the discovery agent 540 is compatible with new releases of existing or competitor products.

The discovery agent 540 uses the interface module 610 to provide the GUI 545 for receiving instructions from the customer and for displaying information to the customer. The interface module 610 can enable a customer to control the function of the extractor module 605 by allowing the customer to manually enter the file system paths for system content files. The interface module 610 can also be used to display various system configurations and receive selections from a user for certain configurations to simulate with the simulator module 615. The interface module 610 may also be used by the simulator module 615 to display simulations of the replacement information management software.

The discovery agent 540 uses the simulator module 615 to enable the customer, or other user, to experience the look and feel of controlling the existing system resources, e.g. the servers 520 and the client computing devices 525, with the features of the replacement software. The simulator module 615 may include functionality of storage manager software and media agent software. The simulator module receives existing system resource information from the extractor module 605 and incorporates the existing system information into simulations of the storage manager software and the media agent software. As manufactures release new versions of the replacement information management software, the manufactures can update the simulator module 615, independent of other modules, to reflect the most up-to-date features of the replacement software.

The discovery agent 540 uses the network module 620 to communicate with network devices for the managing server 510, remote computing device 543, or other resources within the computing system 505. The network module 620 communicates via one or more proprietary and/or non-proprietary network protocols or APIs (including cloud service provider APIs, virtual machine management APIs, and hosted service provider APIs). As communications protocols are changed and improved, e.g., from Internet protocol (IP) version 4 to IP version 6, programmers may update the network module 620 independent of the other modules of the discovery agent 540, so that the discovery agent 540 can take advantage of speed and efficiency improvements associated with new advances in network communications.

The discovery agent 540 uses the upgrade module 625 to transition the computing system 505 from the existing information management system to the replacement information management system. Because the replacement information management system can be configured in various ways, the upgrade module 625 receives system configuration information from the user. In some implementations, the upgrade module 625 receives configuration settings that were selected by the user during simulation. In other implementations, the upgrade module 625 uses the interface module 610 to display a default configuration and to receive adjustments to the default configuration. For example, the upgrade module 625 may display the recommended list of resources of Table 3, and enable the user to adjust the quantities of resources displayed in the list. In response to selection or authorization by the user, the upgrade module 625 interfaces with the resources of the computing system 505 and installs the replacement information management software 537. The upgrade module 625 can manage the software installation by retrieving and installing portions of the replacement information software 537 onto selected ones of the computing devices of computing system 505.

By modularizing the discovery agent 540, various modules can be independently updated to reflect changes to communications protocols, changes to the replacement software product, and changes to competitor software products. Hereafter, various methods for implementing and/or operating the discovery agent 540 are discussed.

Figure 7:
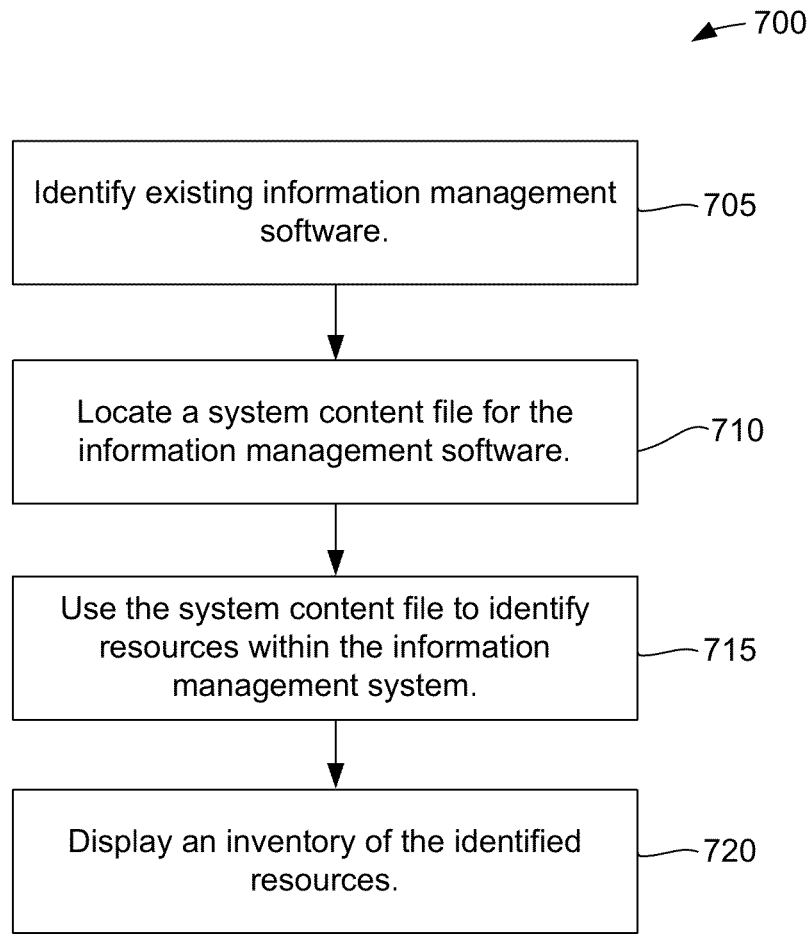
FIG. 7 is a flow chart representation of a process of analyzing a computing system.

FIG. 7 illustrates a method 700 for a discovery agent, such as discovery agent 540, to analyze a computing system having existing information management software. The combination of the computing system and the existing information management software are considered an existing information management system. Using the discovery agent to analyze the computing system is part of a larger process of upgrading the existing information management system with the replacement information management software.

At block 705, the discovery agent identifies existing information management software installed on a computing system. The discovery agent may automatically, pseudo-automatically, or manually identify the existing information management software. The discovery agent may be configured to search a number of directories for names or files associated with competitor or other manufacturers of information management software. The directories may be hard-coded within the discovery agent, or the discovery agent may automatically search one or more logical locations of a file system, e.g., an entire "C:" drive. In order to pseudo-automatically identify an existing information management software, the discovery agent may receive instructions, from a customer, that identify one or more locations of the file system to search. To manually identify the existing information management software, the discovery agent may receive the name of the manufacturer of the existing information management software, for example, using inputs from the GUI 545 that lists various types/models of information management software.

At block 710, the discovery agent locates a system content file of the existing information management software. The system content file identifies the software and hardware resources within the computing system and identifies locations of secondary copies of production data associated with computing devices of the computing system. After identifying the existing information management software, for example by manufacturer name, the discovery agent uses a data structure, such as Table 1, to identify the location of the system content file. Alternatively, the discovery agent may receive a file system path to the system content file from the customer, or other user.

At block 715, the discovery agent parses information from the system content file that identifies the resources, e.g., the computing devices, in the existing information management system. To determine the format of the system content file, the manufacturer of the replacement information management software may reverse-engineer the system content file. For example, the manufacturer of the replacement information management software may purchase licenses to each of the competitors' information management software and install them onto test computing devices. The manufacturer of the replacement information management software may then perform test runs of the competitors' software to generate a test copy of the system content file. The system content file may be a database, an extensive markup language (XML) file, or other structured data file. The manufacturer of the replacement information management software may then create a data structure that includes the formats of the data structures used in the competitors' software products.

Table 4, as shown below, illustrates a sample data structure that maps the format of the data structures in the system content files used by competitor

TABLE 4

| Manufacturer | Column 1 | Column 2 | Column 3 | ... | Column N |
|---|---|---|---|---|---|
| Symantec ™ | Res. ID | Res. Type | Net. Addr. | ... | Storage Cap. |
| EMC² ® | Res. ID | Storage Pol. | Res. Priority | ... | Encrypt. Type |
| IBM ® | IMC ID | Mount Path | Res. ID | ... | Time Stamp |
| ... | | | | ... | | information management software. The columns in Table 4 include manufacturer, column 1, column 2, column 3, and may include many more columns, up to a column N. In a first row of Table 4, a first manufacturer of information management software is listed as Symantec™. According to Table 4, the format of the data structure used in the system content file of information management software by Symantec™ includes a resource ID, followed by a resource type, a network address, additional columns, and a storage capacity of the identified resource. The format of the data structure used in the system content file of information management software by EMC²® may include a resource ID, followed by the type of storage policy, followed by the priority of the resource, and may end with a column for the type of encryption used for secondary copies of data from the identified resource. The format of the data structure used in the system content file of information management software by IBM® may include an information management cell (IMC) ID, a mount path for a resource, a resource ID, and a time stamp. While Table 4 provides examples of a few competitor manufacturers of information management software, the list is not exhaustive.

The discovery agent may use the data structure information of Table 4 in a variety of ways to extract the content of the system content files stored by the existing or competitor information management software. In one implementation, the discovery agent makes a copy of the system content file, changes the name of the system content file, and deletes selected ones of the columns of the system content file that are inapplicable to the data structure format of the replacement information management software. In another implementation, the discovery agent copies selected columns from the system content file into another data structure, such as a database or a spreadsheet. Examples of columns that the discovery agent may copy include resource ID, network address, storage capacity of the resource, type of resource, and the like.

At block 720, the discovery agent displays an inventory of software and hardware resources of the existing information management system or computing system. The discovery agent may use a graphical user interface, email, or a printer to provide the list of resources to both the customer, a sales representative of a replacement software, and to facilitate additional functions by the discovery agent.

Accordingly, in some implementations, the discovery agent may be used in a method for analyzing an existing information management system. The discovery agent may be recorded on or copied to a variety of non-transitory computer-readable media having a number of instructions that, when executed by a processor of a computing device, enable the computing device to perform the method 700. Examples of non-transitory computer-readable media include CD, DVD, USB drive, portable magnetic drive, portable non-volatile memory drive, or the like.

Figure 8:
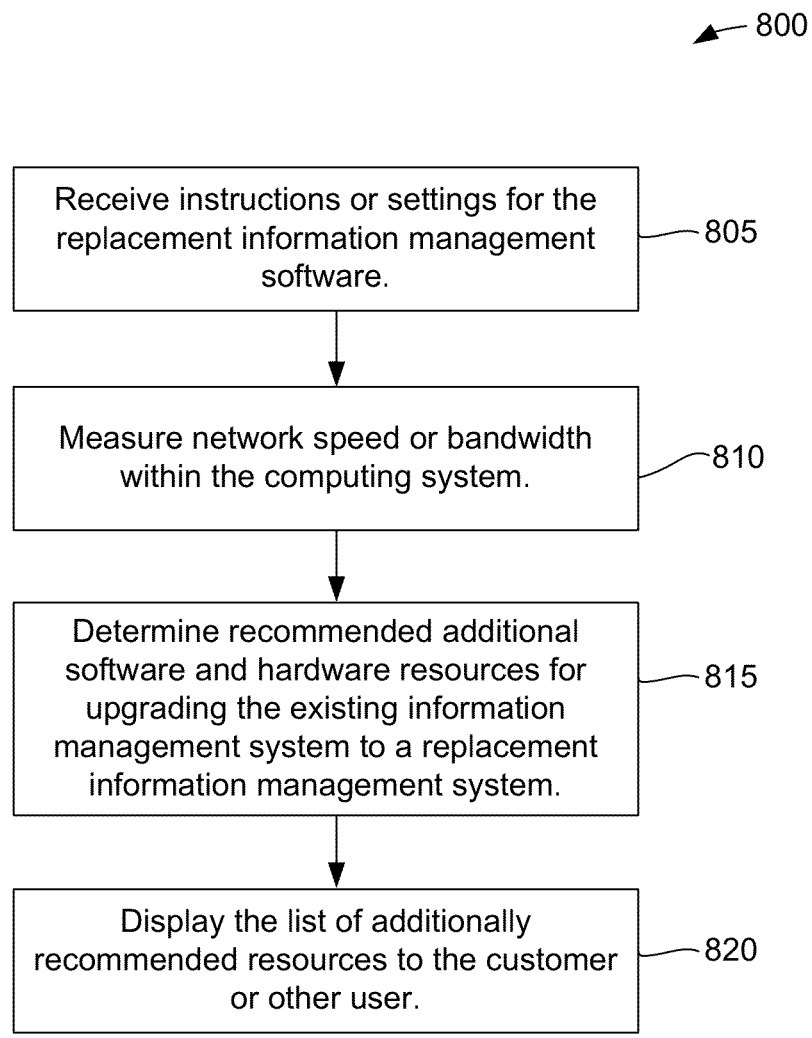
FIG. 8 is a flow chart representation of a process of determining additional resources to support an information management system upgrade.

In addition to analyzing an existing information management system, the discovery agent can generate a list of software and hardware components to support upgrading the existing information management system with replacement information management software. FIG. 8 illustrates a method 800 for generating a list of recommended software and hardware resources to support the installation of a replacement information management system.

At block 805, the discovery agent correlates the software and hardware resources of the existing information management system with resources for a replacement information management system. The software and hardware resources of the existing information management system may be acquired by the discovery agent using techniques such as those described in method 700. The discovery agent may use resource type, resource ID, resource function, or other information from the system content file to identify existing computing devices and software modules. Based on the type or role of the resource, the discovery agent may determine what the equivalent function of a particular resource is within the framework of the replacement information management system. For example, the discovery agent may identify an existing software resource used to manage information associated with a Microsoft Exchange service. The discovery agent may correlate the identified existing software module with, for example, a data agent or media agent of the replacement information management software.

At block 805, the discovery agent receives instructions or settings for functions of the replacement information management software. The discovery agent may receive the instructions from the customer via the user interface. The detailed instructions may include settings such as the frequency by which each of the different types of resources of the computing system are to be backed up. For example, the instructions may include the backup frequencies illustrated in Table 5. As shown in Table 5, the customer may

TABLE 5

| Resource Type | Backup Frequency |
|---|---|
| Workstations | Once a week |
| File Servers | Three times a week |
| Mail Server | Twice a day |
| Databases | Daily | indicate a preference to have workstations backed up once a week, file servers backed up three times a week, mail servers backed up twice a day, and databases backed up daily.

At block 810, the discovery agent measures network speed between various computing devices in the existing information management system. The discovery agent may measure the network speed between the computing device that is allocated to function as a media agent and the network storage that is allocated as a storage resource for the media agent. The discovery agent may also measure the network speed between a computing device that is allocated to function as a media agent and the client computing devices or servers that the media agent will perform backup operations for. To measure the network speed between the various computing devices, the discovery agent may use a network tools such as the 'tracert' command. In a Windows operating system, the tracert command returns the series of IP routers that are used to deliver packets from a first computing device to a second computing device. In some implementations, the discovery agent may transfer large test files, such as a 10 GB file, between computing devices and measure the duration of the file transfer to determine the bandwidth or throughput of the network while loaded. Other network measurement tools may also be used.

At block 815, the discovery agent determines recommendations for additional hardware and software resources to add to the existing information management system during an upgrade to the replacement information management software. The discovery agent may calculate an approximate load that backing up each resource places on the network and make recommendations for additional hardware and software resources based on the calculated load. For example, the data agent may multiply the number of workstations, e.g., 70, by the storage capacity of each workstation, e.g., 100 GB, by the backup frequency of each workstation in terms of weeks, e.g., 1 per week, to generate an approximate data load (70*100 GB*1/week=7 TB/week). Based on the approximate data load and the determined network bandwidth or network speed, the discovery agent may determine, for example, and that a particular computing system could perform storage operations 45% faster with the addition of two additional computing devices dedicated as media agents and two network storage devices dedicated as storage resources for the two media agents.

At block 820, the discovery agent displays a list of additionally recommended resource for supporting the upgrade. The discovery agent may display or provide the list to the customer or other user via a graphical user interface, via email, or through a printer. For example of a list of additionally recommended resources is shown above as Table 3. As described above, the customer can accept or modify the list of recommended resources prior to making a purchase. Additionally, as shown in Table 3, the discovery agent can provide prices for each of the resources to enable the customer to evaluate the total cost of the upgrade.

Figure 9:
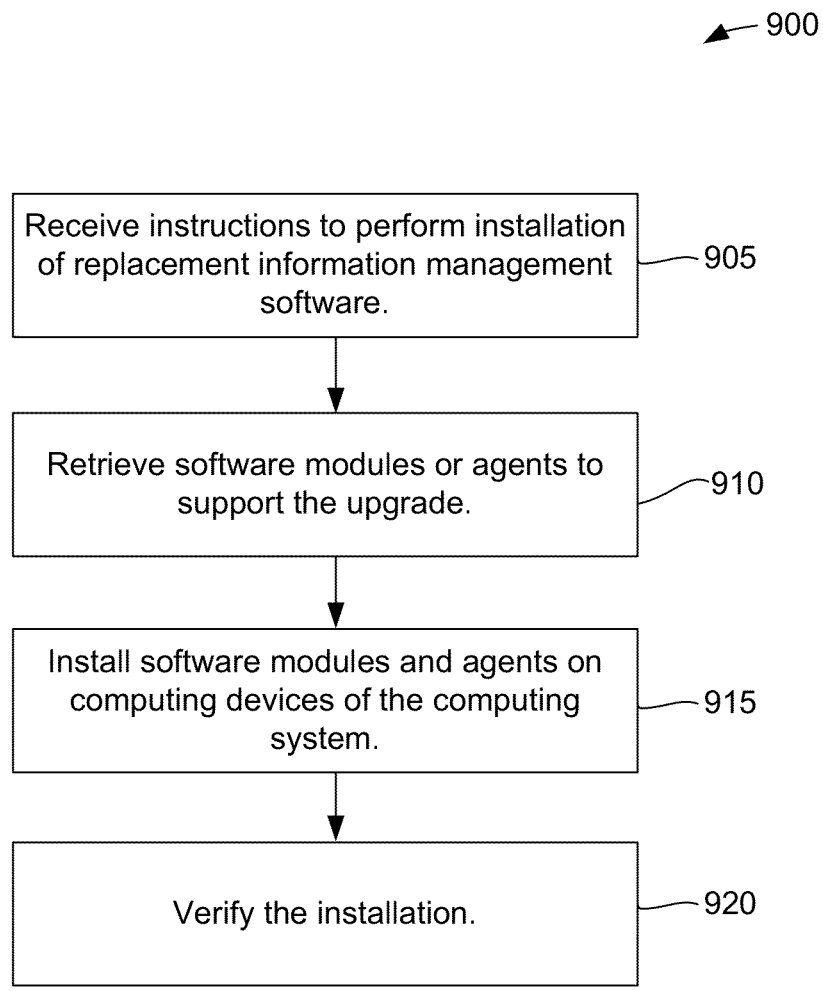
FIG. 9 is a flow chart representation of a process of installing replacement information management software.

After providing the customer, or other user, with a number of options for upgrading the existing information system, and in response to a particular selection by the customer, the discovery agent can facilitate the installation of the software resources of the replacement information management system. FIG. 9 illustrates a method 900 of facilitating the installation of replacement information management software across a computing system with the discovery agent.

At block 905, the discovery agent receives, from the user, instructions to install replacement information management software in computing devices of the computing system, e.g., computing system 505, to upgrade the existing information management software with a replacement information management software. The discovery agent may receive instructions from the user via a GUI. The instructions identify which software modules or agents to install on which computing devices. In one implementation, the discovery agent displays a graphical representation of the computing system, e.g., similar to the representation of FIG. 5, via the GUI, and the customer drags and drops the names of software modules or agents from a list, e.g., like the list of Table 3, onto graphical representations of computing devices to provide instructions to the discovery agent. Alternatively, the discovery agent may install software modules or agents based on the roles of the computing devices, as determined by reading the system content file. Other techniques may be used to instruct the discovery agent where to install the software modules. Examples of software modules are identified in the information management cell 350 of FIG. 4 and include, inter alia, a network agent, a management agent, a jobs agent, an interface agent, a storage manager database, a media agent network module, a content indexing module, the media agent database, an encryption module, a compression module, a distribution client of a client computing device, a data management agent of a client computing device, and the like.

At block 910, the discovery agent retrieves software modules or agents to support upgrading the existing information management software. The software modules or agents may be installed directly onto a managing server of the computing system. However, rather than installing several software resources on the managing server for distribution, the discovery agent may retrieve copies of each software resource from a remote computing device, such as remote computing device 543, and store the copies directly onto the corresponding computing devices. Advantageously, the customer can immediately begin installation of the software upgrade at its convenience rather than waiting for copies of the media to arrive through a postal service.

At block 915, the discovery agent installs software modules and agents on the computing devices. The managing server may initiate installation of the software resources remotely onto each of the computing devices of the computing system by remotely executing a batch file or other script, e.g., from the command prompt. This automated operation saves the customer the time it would take to manually insert a computer-readable media into each computing device to manually install the software resources.

At block 920, the discovery agent runs a diagnostics tests on the computing devices and notifies the user of errors or software installation failures. The installation of the software resources of the replacement information management software may include modules that enable each of the computing devices to communication with other ones of the computing devices. For example, a network module of a storage manager, a network module of the media agent, and a data management agent of each client computing device may enable each of the storage manager, the media agent, and the other computing devices to communicate with one another. The discovery agent may use the network modules to verify that each portion of the replacement information management software has been successfully installed.

The methods 700, 800, and 900 disclose functions of a discovery agent that enable a sales representative or a software company to analyze a customer's existing information management system, produce an itemized list of resources for a replacement information management system, and facilitate the installation of the replacement information management software resources onto the customer's computing system. The disclosed systems and methods include various advantages for replacing a competitor's existing information software with a replacement information system software. Some of the advantages include: quickly discovering the existing computing devices by using files created by the existing or competitor information system, producing an itemized price list of recommended additional software and hardware resources to enable the customer to make an informed decision, and automating the installation of replacement information software resources to save the customer the time of having to manually install software on each of the computing devices of the computing system.

Resource Identification Using a Search Module

As described above, some customers will have a computing system that includes information management software already installed on one or more computing devices of the computing system. However, some customers may not yet have implemented an information management system (inclusive of information management software installed on various computing devices of the client's computing system to create and manage secondary copies of production data). The discovery agent described in the previous systems and methods may be used to analyze computing systems that do not have an existing information management system and may be used to facilitate the installation of a new information management system.

Figure 10:
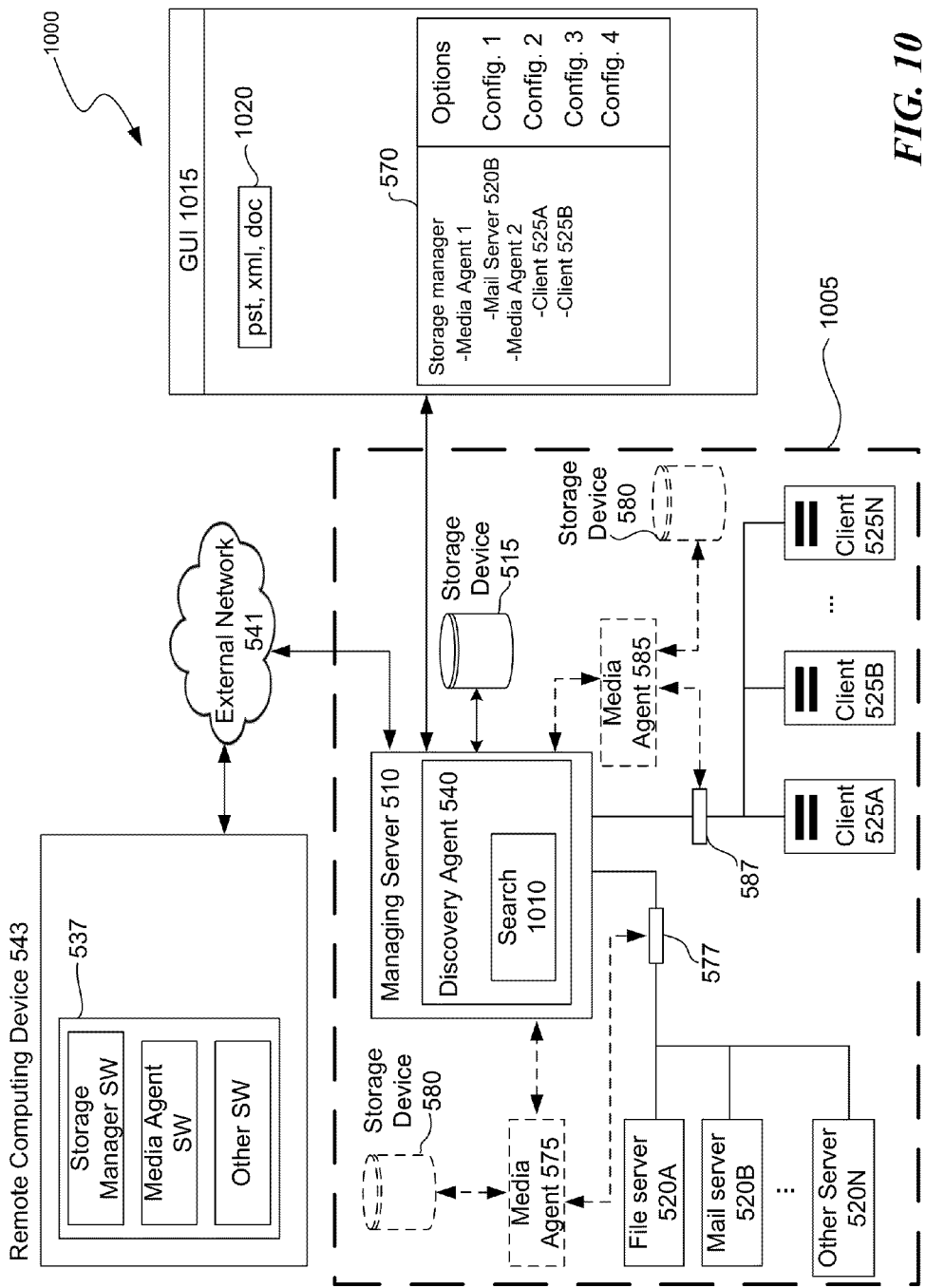
FIG. 10 is a block diagram illustrating an example of analyzing a computing system to install new information management software.

FIG. 10 illustrates a computing environment 1000 that uses the discovery agent to analyze a computing system 1005 lacks an existing information management system. The discovery agent also facilitates the disbursement of information management software 537 throughout the computing system 1005 to provide information management services, such as the implementation of data storage policies, data retrieval policies, and data aging policies.

Computing system 1005 includes many of the similar computing devices as computing system 505. The computing system 1005 differs from computing system 505 in that the computing system 1005 does not include an installation of existing information management software on the managing server 510.

The discovery agent 540 may identify the software and hardware resources of computing system 1005 without relying on information provided by existing information management software. In particular, the system content file 535 may not reside on the managing server 510 for the discovery agent 540 to extract information regarding the software and hardware resources of the computing system 1005. Instead, the discovery agent 540 includes a search module 1010, in addition to the extractor module 605, the interface module 610, the simulator module 615, the network module 620, and the upgrade module 625. The discovery agent 540 uses the search module 1010 to search through the computing system 1005 to identify the software and hardware resources of the computing system 1005. Details regarding the discovery of network resources may be found in the assignee's U.S. patent application Ser. No. 11/120,619, filed May 2, 2005, entitled HIERARCHICAL SYSTEMS AND METHODS FOR PROVIDING A UNIFIED VIEW OF STORAGE INFORMATION, now U.S. Pat. No. 7,343,453, which is hereby incorporated herein by reference in its entirety. Other methods for analyzing or "crawling" a computer network to discover the various resources discussed above are of course possible as is known by those of ordinary skill in the relevant art.

The search module 1010 may use Microsoft Active Directory tools to determine the resources of the computing system 1005. Active Directory is a directory service created by Microsoft for Windows domain networks and is included in most Windows Server operating systems. Active Directory provides a central location for network administration and security. The search module 1010 can use various Active Directory queries to retrieve information about the resources of the computing system 1005. For example, the search module 1010 can use command line query tools such as the 'dsquery' tool, the 'dsget' tool or 'ldifde'. Each of these tools can be integrated into the search module 1010 to retrieve a list of software and hardware resources of the computing system 1005, such as computer names, server names, server descriptions, operating systems, IP addresses of the computers and servers, subnet properties, or the like. Once the IP addresses are retrieved, the search module 1010 may obtain additional information about the hardware resources by using other network-related tools. For example, search module 1010 may use the 'fdisk' command to determine the storage capacity of each of the network storage drives, the servers, and the computing devices.

The search module 1010 may use other techniques to determine the resources of the computing system 1005. Many third party vendors create tools that are useful for mapping or determining the resources of network. For example, Wireshark is a network analysis tool that is open source and can incorporated into the search module 1010 for use on either Windows or Unix-based computing devices to search for network devices. Other examples of network analysis tools include LANsurveyor® software by SolarWinds®. The LANsurveyor® software automatically discovers every device on a network, including routers, switches, servers, wireless access points, voice over IP phones, desktops, and printers, by using network discovery methods such as simple network management protocol (SNMP), ping, and the like. By incorporating the functions and features of one or more third-party network mapping tools, the search module 1010 may enable the discovery tool to automatically determine the software and hardware resources available in the computing system 1005.

The search module 1010 may include a file-level system search. For example, in addition to identifying what resources are available in the computing system 1005, the search module 1010 may enable the customer or user to identify file-level resources or production data. For example, GUI 1015 may include a text box 1020 that enables the customer to specify file extensions that the discovery agent 540 should search for and quantify, e.g., pst, xml, doc. In some implementations, the search module 1010 displays file-level search results in a list. Table 6, shown below, is an example of a list of file-level

TABLE 6

| Resource ID | File Type | File Size |
| --- | --- | --- |
| Mail Server 520B | PST | 2 TB |
| Client 525A | PST | 80 GB |
| Client 525A | DOC | 30 GB |
| Client 525B | PST | 225 GB |
| Client 525B | DOC | 20 GB |
| ... | ... | ... |
| Network Total | PST | 5.24 TB |
| Network Total | DOC | 835 GB | search results that may be returned by the search module 1010. Table 6 includes columns identifying the resource ID, the file type, and the file size. Some example file types include personal storage table (pst) and Word documents (doc). The last rows of Table 6 include network totals for each of the file types, and discovery agent 540 may use the network totals to determine recommendations for information management system configurations.

Depending upon various characteristics of the computing system 1005, the discovery agent 540 and search module 1010 may be run multiple times to account for different operating systems and various network configurations, e.g., Active Directory configurations. For example, the discovery agent 540 may be run on the managing server 510 for a Windows subnet and may be run on another managing server for a UNIX-based subnet in order to gather software, hardware, and/or file-level resource information. In some implementations, the discovery agent 540 may be run once on each Active Directory partition. The discovery agent 540 may then send the results of each query to the managing server 510 to be compiled and to be displayed by GUI 1015. Alternatively, the discovery agent 540 uses the external network 541 to transmit the results of each network search to the remote computing device 543 for compilation. A complete list of all network resources may then be displayed by the GUI 1015, may be printed, or may be emailed to the customer.

Additional functions of the discovery agent 540 were discussed previously in connection with the computing environment 500. In particular, the discovery agent 540 may simulate the new information management system by executing a local or remote instance of the new information management software with the retrieved resources of the computing system 1005. The discovery agent 540 enables the customer to interact with the simulation with the window 570 of the GUI 1015. The discovery agent 540 may also provide the customer with various optional configurations, such as configuration 1, configuration 2, configuration 3, and configuration 4. The discovery agent 540 may receive a selection for a particular configuration of the new information management system via the GUI 1015 and may generate a list of additional recommended software and hardware resources, such as the list of Table 3. In response to instructions from the customer, the discovery agent 540 then manages the automated installation of the software modules and agents onto select computing devices within the computing system 1005.

The discovery agent 540 may be downloaded onto a local computing device, such as managing server 510, from a cloud computing device or other remote computing device. When executed by the processor of the local computing device, the discovery agent may cause the local computing device to perform a method 1100 of installing new information management software.

Figure 11:
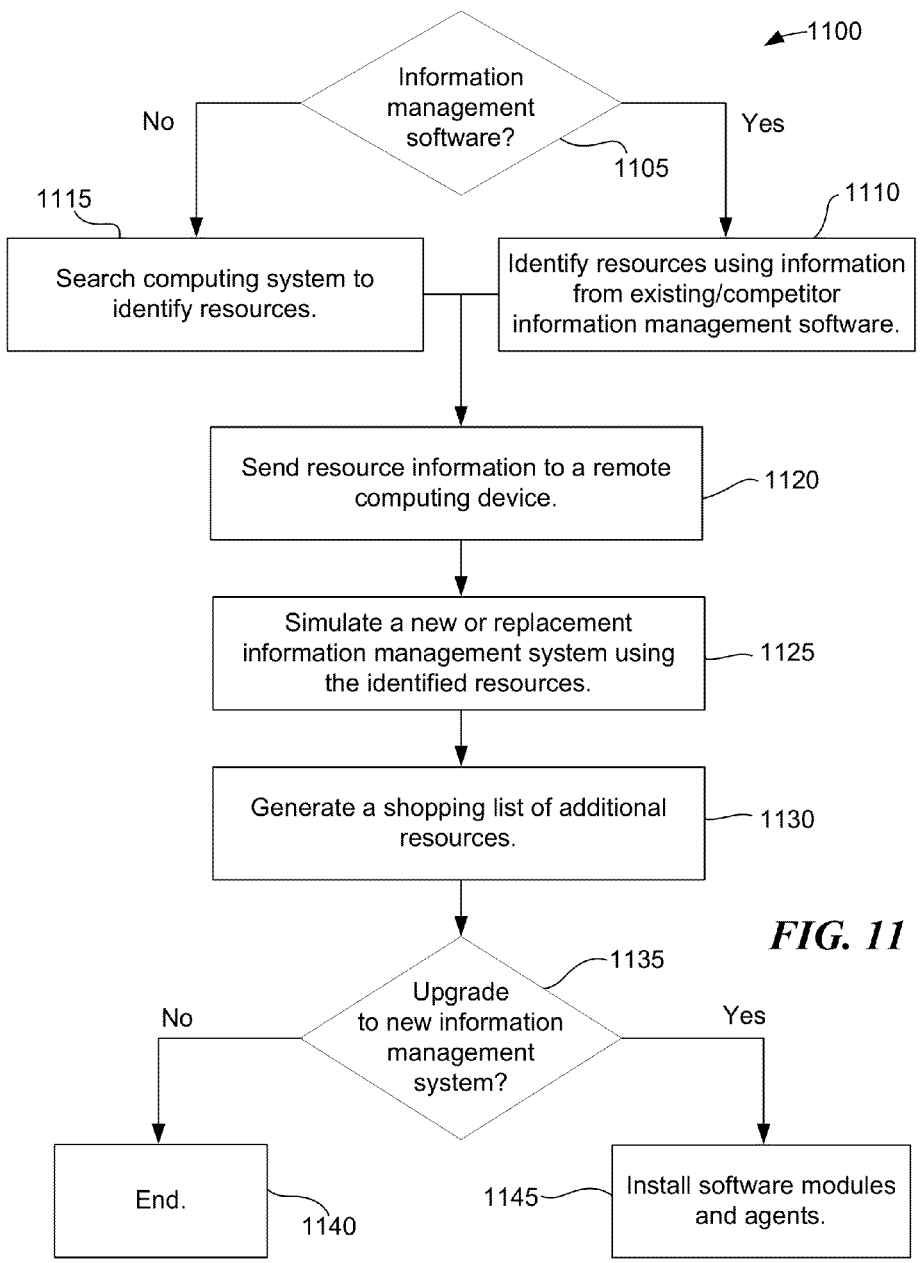
FIG. 11 is a flow chart representation of a process of replacing information management software.

FIG. 11 illustrates a method 1100 of using a discovery agent to newly install information management software or to replace existing information management software with replacement information management software. The discovery agent may enable a customer to simulate the replacement software using existing system resources to allow the customer to test the look and feel of the replacement software before committing to the replacement software. The discovery agent may also automate the process of collecting information about the existing system to save the customer the time and effort of providing information about the existing system.

At block 1105, the discovery agent determines whether an existing information management software is installed on a customer's computing system. The customer's computing system may include a managing server, one or more file or mail servers, one or more client computing devices, and one or more network storage devices. The discovery agent may determine whether an existing information management software is installed on the customer's computing system by automatically searching for files or directories that identify competitor or existing information management software. Alternatively, the discovery agent may determine whether an existing information management software is installed on the customer's computing system by receiving notification from the user via a GUI or command-line user interface. If the existing software is identified, the process proceeds to block 1110. If existing software does not exist, the process proceeds to block 1115.

At block 1110, the discovery agent identifies software and hardware resources in the customer's computing system by using information from the existing or the competitor information management software. The discovery agent may be preprogrammed with file system paths to the location of a system content file generated by the existing information management software. The system content file may include various information about the software and hardware resources of the computing system, such as resource ID, storage capacity of hard drives, resource type, storage policy type, locations of secondary copies of production data in network storage devices, network addresses, operating systems, and the like. Instead of discovering the location of the system content file automatically, discovery agent may enable the customer to browse or type the file system path of the system content file. The discovery agent copies, extracts, or parses resource information from the system content file and stores the resource information to a file, displays the resource information via a GUI, and/or sends the resource information to a printer.

At block 1115, the discovery agent searches the customer's computing system to identify each of the software and hardware resources. As discussed above, various tools may be used to perform the search, including query tools associated with Active Directory, SNMP, and/or various third-party software. Similar to block 1110, the discovery agent stores the resource information to a file, displays resource information by a GUI, and/or sends the resource information to printer.

At block 1120, the discovery agent sends the resource information to the remote computing device. The discovery agent may send the resource information to the remote computing device as a single file or as multiple files associated with different operating systems, different subnets, or other configurations. The remote computing device, or cloud computing device, receives and compiles the resource information retrieved by the discovery agent.

At block 1125, the remote computing device simulates the new or replacement information management system using the resource information received from the discovery agent. While simulating the information management system, the remote computing device may provide multiple configurations for the customer to choose from. By simulating the information management system, the remote computing device provides the customer with the opportunity to experience the look and feel of the new or replacement information management software prior to committing to purchasing and installing the information management software. In some implementations, the local computing device, on which the discovery agent is installed, simulates the new or replacement information management system in place of the remote computing device.

At block 1130, the discovery agent or the remote computing device generates a list of additional resources to support the installation of the new or replacement information management system. As described previously, the discovery agent may generate a list of additional resources based on preferential input received from the customer, or the discovery agent may automatically generate the list of additional resources based on system characteristics such as quantity of data to back up, network speed, network bandwidth, data storage policy, and the like. The discovery agent electronically mails or generates the list of additional resources along with the prices for each of the resources to enable the customer to make an informed decision about the cost of the upgrade. An example list of additional resources is included in Table 3.

At block 1135, the discovery agent determines whether to install the new information management system or to upgrade the existing information management system with a replacement information management system. In practice, the discovery agent may receive instructions from the customer as to whether the discovery agent is authorized to proceed with the installation. The discovery agent may receive instructions from the user from, for example, a graphical or command-line user interface. If the discovery agent receives instructions not to perform the installation, the process proceeds to block 1140 and ends. Alternatively, the process proceeds to block 1145.

At block 1145, the discovery agent installs various software modules and agents associated with the new or replacement information management software. According to various installations, the discovery agent installs storage manager agents on the computing device that is designated by the customer as the storage manager. To support the storage manager installation, the discovery agent installs, among other things, a network agent, a management agent, a jobs agent, an interface agent, and a database. The discovery agent installs media agent modules on the one or more computing devices designated by the customer to be media agents. To support media agent installations, the discovery agent installs a network module, a content indexing module, media file systems module, a deduplication module, a data classification module, an encryption module, a compression module, a distribution module, and a media agent database. On other computing devices, the discovery agent installs distribution clients and data management agents to enable the other computing devices to communicate with the storage manager, the media agents, and with each other computing device.

Post-Installation Reports Generation

Figure 12A:
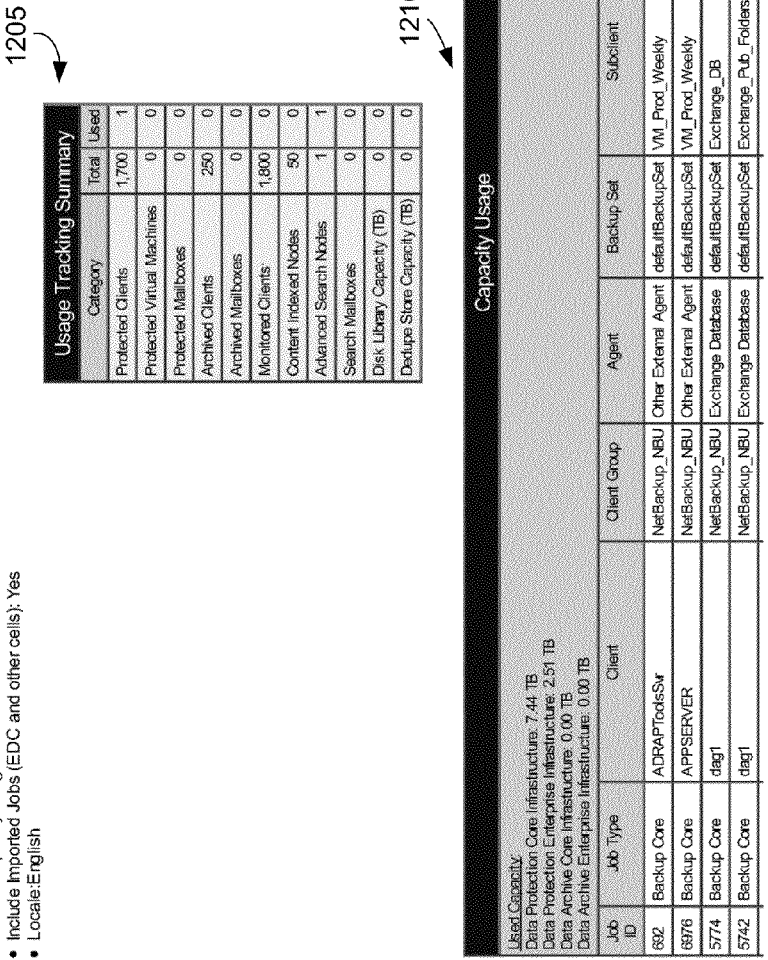
Figure 13B:
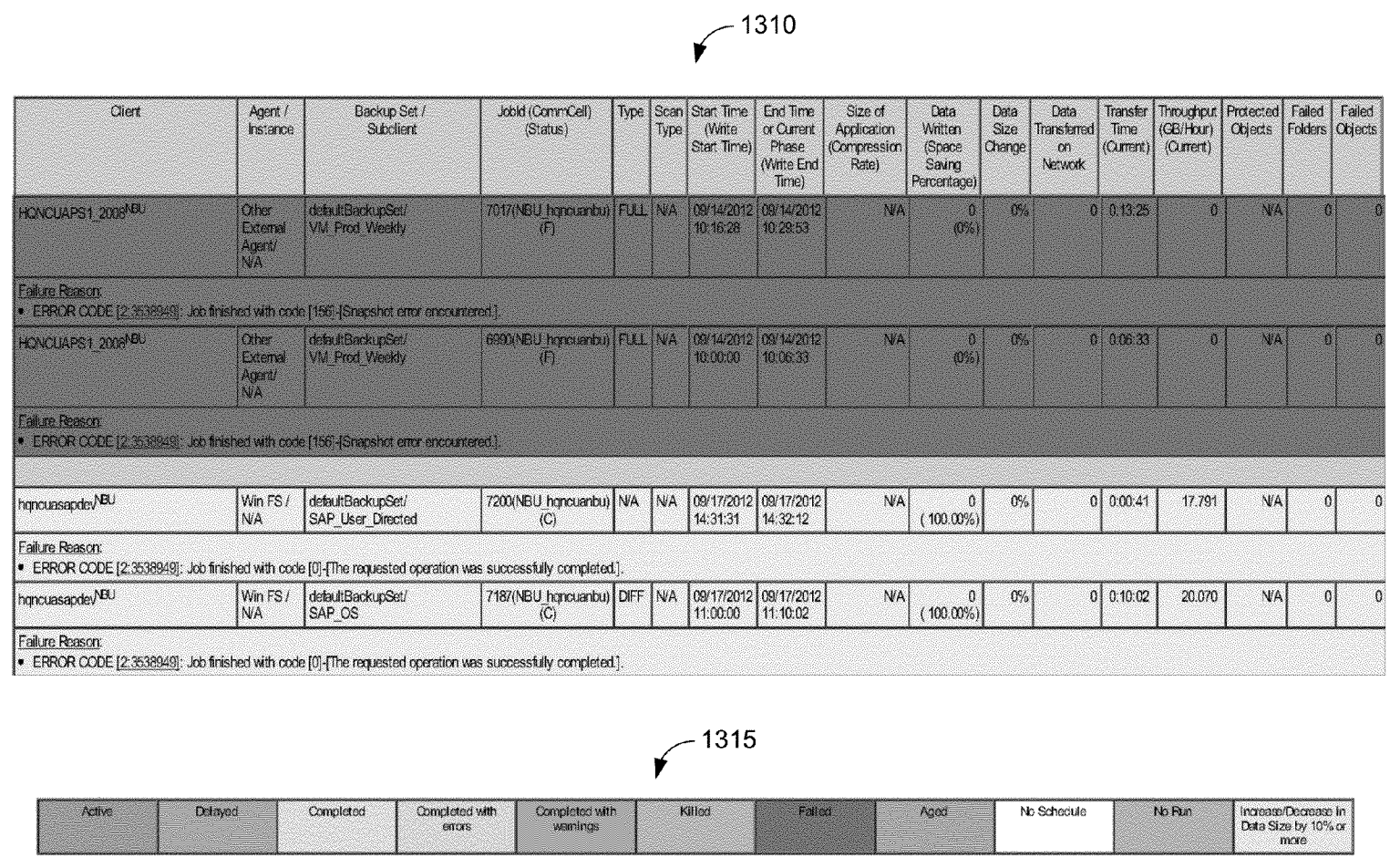

The discovery agent, the remote computing device, or the installed replacement information management software may generate various reports after or during the installation of the new or replacement information management system. The reports may provide summaries for the licenses installed in the customer's computing system, and the reports may provide updates about the status of jobs that are running on the new installation. FIGS. 12A and 12B illustrate an example of a License Summary Report, and FIGS. 13A and 13B illustrate an example of a Backup Jobs Summary Report.

FIG. 12A is a portion of a License Summary Report 1200 that includes a license usage tracking summary table 1205 and a capacity usage table 1210. The license usage tracking summary table 1205 shows the categories of resources, e.g., protected clients and protected mailboxes. The license usage tracking summary table 1205 also includes the total number of licenses and the number of licenses used. The total number of licenses can be the total number of recommended licenses for a customer's system or it can be the total number of licenses that have been purchased. As shown, only one protected license out of a total of 1,700 has been used in the illustrated example.

The license capacity usage table 1210 illustrates jobs that were imported from an existing information management software. In particular, the license capacity usage table 1210 includes a column for client group which shows a client group 'NetBackup. The license capacity usage table 1210 also includes columns of information identifying job ID, job type, client name, data agent, data storage policy, job size, deduplication settings, and secondary encryption settings. The license usage tracking summary table 1205 and the license capacity usage table 1210 enable a user to track the number of licenses being used and the status of jobs imported from the existing information management system to the replacement information management system.

FIG. 12B is another portion of the example License Summary Report 1200 that may be generated by the discovery agent, remote computing device, or new information management software, for a customer. FIG. 12B illustrates a license usage table 1215. The license usage table 1215 includes license types, permanent total license, permanent total licenses used, evaluation licenses that are available, and evaluation licenses that have been used. Examples of license types include: iDataAgent licenses which correspond to the disclosed data management agent 280; MediaAgent licenses which correspond to the disclosed media agent 410; library control license; and shared storage license.

FIG. 13A illustrates an example of a Backup Jobs Summary Report 1300. The Backup Jobs Summary Report 1300 includes a summary table 1305 and summary table 1310 (shown in FIG. 13B). The summary table 1305 includes various information about the status of backup jobs. The summary table 1305 includes the client names, the total number of jobs for each client, and a number of backup jobs: completed, completed with errors, completed with warnings, killed, unsuccessful, running, and delayed. A job status of no run means a job failed to start because another job is running or because activity is disabled. A job status of no schedule includes subclients not protected by data protection jobs. The summary table 1305 also includes the size of the application or job, the amount of data backed up or written, the time that the backup jobs start and stop, the number objects backed up or scheduled for backup, and the number of objects that failed backup operations.

FIG. 13B illustrates the summary table 1310 which includes more detailed information about specific jobs. The summary table 1310 may be color-coded to quickly indicate which jobs are running successfully, which jobs are running with errors, and which jobs have failed to run. For example, the first two rows of clients in the summary table 1310 are color-coded red to indicate that the backup job failed. The last two rows of clients in the summary table 1310 are color-coded green to indicate that the backup jobs succeeded. The columns of the summary table 1310 include client name, agent, subclient, job ID, type of backup, start and end times, amount of data written, transfer time, and network throughput or bandwidth.

The color-coding key 1315 provides examples of other characteristics or job statuses that can be displayed on the summary table 1310. Example colors and coding include: Active—blue; Delayed—purple; Completed—green; Completed with errors—yellow; Completed with warnings—dark green; Killed—pink; Failed—red; Aged—bronze; No schedule—white; and No run—light pink.

By providing license summary reports and job summary reports to the customer, the discovery agent or replacement information management software enables the customer to quickly track the progress of license installations and the status of backup jobs. Thus, the report feature provides added benefit to the customer by assisting the tracking of the installation process and by enabling the customer to see which jobs and clients may need additional attention. While certain reports and data with the reports are provided, other reports and/or other data may of course be displayed.

CONCLUSION

Systems and modules described herein may comprise software, firmware, hardware, or any combination(s) of software, firmware, or hardware suitable for the purposes described herein. Software and other modules may reside on servers, workstations, personal computers, computerized tablets, PDAs, smart phones, and other devices suitable for the purposes described herein. Modules described herein may be executed by a general-purpose computer, e.g., a server computer, wireless device, or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like, are generally used interchangeably herein and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, a network, a browser, or other application in an ASP context, or via another means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Examples of the technology may be stored or distributed on computer-readable media, including magnetically or optically readable computer disks, hard-wired or preprogrammed chips (e.g., EEPROM semiconductor chips), nanotechnology memory, biological memory, or other data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the systems described herein. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain examples are presented below in certain forms, the applicant contemplates the various aspects of the invention in any number of claim forms. Accordingly, the applicant reserves the right to add additional claims after filing the application to pursue such additional claim forms for other aspects of the invention.

The invention claimed is:

1. At least one tangible computer-readable medium, excluding a signal, storing instructions for a discovery agent which, when executed by at least one data processing device, perform a method of demonstrating new data storage and recovery software for use on a computing system, wherein the computing system includes multiple computing devices networked together, wherein one of the multiple computing devices is a network management computing device, the method comprising:
   determining, by the discovery agent that is installed on the network management computing device,
      whether existing data storage and recovery software is installed in the computing system, wherein the existing data storage and recovery software is manufactured by a competitor manufacturer,
      wherein the determining includes:
         searching directories of a file system of the network management computing device for a file name or folder name of the existing data storage and recovery software that identifies the competitor manufacturer of the existing data storage and recovery software, or
         receiving affirmation of installation of the existing data storage and recovery software from a user via a user interface;
   if the discovery agent determines that the existing data storage and recovery software is installed in the computing system, identifying a subset of the multiple computing devices of the computing system based on a system content file associated with the existing data storage and recovery software,
      wherein identifying the subset of the multiple computing devices includes:
         locating the system content file in the file system of the network management computing device,
            wherein locating includes searching one or more predetermined paths in the file system of the network management computing device,
            wherein the one or more predetermined paths are hardcoded into the discovery agent, and
         extracting characteristics of the subset of the multiple computing devices from the system content file;
   transmitting, by the discovery agent, the extracted characteristics of the subset of the multiple computing devices to a remote computing device to enable the remote computing device to provide a simulation to a user of the new data storage and recovery software,
      wherein the simulation of the new data storage and recovery software incorporates the extracted characteristics of the subset of the multiple computing devices in the simulation to enable the user to test features of the new data storage and recovery software on simulated versions of the subset of the multiple computing devices,
      wherein the remote computing device is external to the computing system;
   providing, by the discovery agent, a list of software licenses for the new data storage and recovery software based on the subset of the multiple identified computing devices of the computing system,
      wherein the software licenses are licenses to individual software components of the new data storage and recovery software,
      wherein the list of the software licenses includes prices for the software licenses; and
   installing, by the discovery agent that is installed on the network management computing device, the individual software components onto the subset of the multiple computing devices to enable operation of the new data storage and recovery software within the computing system.

2. The tangible computer-readable media of claim 1, further comprising:

if the discovery agent determines that the existing data storage and recovery software is not installed in the computing system, identifying at least the subset of the multiple computing devices of the computing system by:
scanning the computing system for network addresses of the at least subset of the multiple computing devices, and
querying the at least subset of the multiple computing devices based on the network addresses to retrieve the extracted characteristics of the at least subset of the multiple computing devices, wherein the extracted characteristics include:
name,
data storage capacity,
type of operating system used by the at least subset of the multiple computing devices, and
whether the at least subset of the multiple computing devices operate as a server.

3. The tangible computer-readable media of claim 1 wherein locating the system content file in the file system of the network management computing device, includes:
searching the directories of the file system of the network management computing device, if searching the one or more predetermined paths in the file system of the network management computing device fails to result in locating the system content file, or
receiving a file system path of the system content file from the user via the user interface, if searching the one or more predetermined paths in the file system of the network management computing device fails to result in locating the system content file.

4. The tangible computer-readable media of claim 1 wherein providing the list of software licenses based on the subset of the multiple computing devices of the computing system includes:
determining network throughput between the subset of the multiple computing devices;
determining a frequency of backup operations for the subset of the multiple computing devices;
determining a storage capacity of the subset of the multiple computing devices; and
determining a recommended number of media agents to include in the computing system based on data load on the network, wherein the data load is based on the network throughput, the frequency of backup operations, and the storage capacity of the subset of the multiple computing devices, wherein a media agent manages a creation and restoration of backup copies of data generated by the subset of the multiple computing devices.

5. The tangible computer-readable media of claim 1 wherein a portion of the discovery agent operates on the remote computing device, wherein the remote computing device provides multiple configurations of the simulated versions of the subset of the multiple computing devices in the simulation of the new data storage and data recovery software to enable the user to determine which one of the multiple configurations to use while installing the new data storage and recovery software.

6. The tangible computer-readable media of claim 1, further comprising:
receiving assignments of the individual software components to the subset of the multiple computing devices of the computing system from the user via the user interface, wherein receiving the assignments includes:
displaying a graphical representation of the subset of the multiple computing devices on the user interface;
displaying a user-manipulatable version of the list of software licenses; and
enabling each item of the list of software licenses to be dragged and dropped by the user onto the graphical representation of the subset of the multiple computing devices,
wherein the individual software components correspond to respective items of the list of software licenses,
wherein installing the individual software components includes installing the individual software components according to the received assignments.

7. The tangible computer-readable media of claim 1, further comprising: copying the extracted characteristics of the subset of the multiple computing devices into a database for the new data storage and recovery software to enable the installation of the new data storage and recovery software to manage backup jobs and stored backup copies that were created by the existing data storage and recovery software prior to the installation or operation of the new data storage and recovery software.

8. The tangible computer-readable media of claim 1 wherein extracting the characteristics of the subset of the multiple computing devices from the system content file includes selecting one of multiple formats for the system content file from a system content file format data structure, wherein the system content file format data structure includes multiple formats for headers of the system content file, wherein each of the multiple formats for headers of the system content file are grouped by names of manufacturers of information management software products, within the system content file format data structure.

9. A method performed by a discovery agent of demonstrating new data storage and recovery software for use on a computing system, wherein the computing system includes multiple computing devices networked together, wherein one of the multiple computing devices is a network management computing device, and wherein the discovery agent is installed on the network management computing device, the method comprising:
determining, by the discovery agent, whether existing data storage and recovery software is installed in the computing system,
wherein the existing data storage and recovery software is manufactured by a competitor manufacturer,
wherein the determining includes:
searching directories of a file system of the network management computing device for a file name or folder name of the existing data storage and recovery software that identifies the competitor manufacturer of the existing data storage and recovery software, or
receiving affirmation of installation of the existing data storage and recovery software from a user via a user interface;
if the discovery agent determines that the existing data storage and recovery software is installed in the computing system, identifying a subset of the multiple computing devices of the computing system based on a system content file associated with the existing data storage and recovery software,
wherein identifying the subset of the multiple computing devices includes:
locating the system content file in the file system of the network management computing device, wherein locating includes searching one or more predetermined paths in the file system of the network management computing device, wherein the one or more predetermined paths are hardcoded into the discovery agent, and
extracting characteristics of the subset of the multiple computing devices from the system content file;
transmitting, by the discovery agent, the extracted characteristics of the subset of the multiple computing devices to a remote computing device to enable the remote computing device to provide a simulation to a user of the new data storage and recovery software,
wherein the simulation of the new data storage and recovery software incorporates the extracted characteristics of the subset of the multiple computing devices in the simulation to enable the user to test features of the new data storage and recovery software on simulated versions of the subset of the multiple computing devices,
wherein the remote computing device is external to the computing system; and
providing, by the discovery agent, a list of software licenses for the new data storage and recovery software based on the subset of the multiple identified computing devices of the computing system,
wherein the software licenses are licenses to individual software components of the new data storage and recovery software,
wherein the list of the software licenses includes prices for the software licenses.

10. The method of claim 9, further comprising:
if the discovery agent determines that the existing data storage and recovery software is not installed in the computing system, identifying at least the subset of the multiple computing devices of the computing system by:
scanning the computing system for network addresses of the at least subset of the multiple computing devices, and
querying the at least subset of the multiple computing devices based on the network addresses to retrieve the extracted characteristics of the at least subset of the multiple computing devices, wherein the extracted characteristics include:
name,
data storage capacity,
type of operating system used by the at least subset of the multiple computing devices, and
whether the at least subset of the multiple computing device operate as a server.

11. The method of claim 9 wherein locating the system content file in the file system of the network management computing device, includes:
searching the directories of the file system of the network management computing device, if searching the one or more predetermined paths in the file system of the network management computing device fails to result in locating the system content file, or
receiving a file system path of the system content file from the user via the user interface, if searching the one or more predetermined paths in the file system of the network management computing device fails to result in locating the system content file.

12. The method of claim 9 wherein providing the list of software licenses based on the subset of the multiple computing devices of the computing system includes:

determining network throughput between the subset of the multiple computing devices;
determining a frequency of backup operations for the subset of the multiple computing devices;
determining a storage capacity of the subset of the multiple computing devices; and
determining a recommended number of media agents to include in the computing system based on data load on the network, wherein the data load is based on the network throughput, the frequency of backup operations, and the storage capacity of the subset of the multiple computing devices, wherein a media agent manages a creation and restoration of backup copies of data generated by the subset of the multiple computing devices.

13. The method of claim 9 wherein extracting the characteristics of the subset of the multiple computing devices from the system content file includes selecting one of multiple formats for the system content file from a system content file format data structure, wherein the system content file format data structure includes multiple formats for headers of the system content file, wherein each of the multiple formats for headers of the system content file are grouped by names of manufacturers of information management software products, within the system content file format data structure.

14. A discovery agent for demonstrating new data storage and recovery software for use on a computing system, wherein the computing system includes multiple computing devices networked together, wherein one of the multiple computing devices is a network management computing device, and wherein the discovery agent is installed on the network management computing device, the discovery agent comprising:
at least one processor;
at least one data storage device;
a determining unit configured to determine whether existing data storage and recovery software is installed in the computing system,
wherein the existing data storage and recovery software is manufactured by a competitor manufacturer,
wherein the determining includes:
searching directories of a file system of the network management computing device for a file name or folder name of the existing data storage and recovery software that identifies the competitor manufacturer of the existing data storage and recovery software, or
receiving affirmation of installation of the existing data storage and recovery software from a user via a user interface;
an identifying unit configured to, when the determines unit determines that the existing data storage and recovery software is installed in the computing system, identify a subset of the multiple computing devices of the computing system based on a system content file associated with the existing data storage and recovery software,
wherein identifying the subset of the multiple computing devices includes:
locating the system content file in the file system of the network management computing device,
wherein locating includes searching one or more predetermined paths in the file system of the network management computing device, wherein the one or more predetermined paths are hardcoded into the discovery agent, and
extracting characteristics of the subset of the multiple computing devices from the system content file;

a transmitting unit configured to transmit the extracted characteristics of the subset of the multiple computing devices to a remote computing device to enable the remote computing device to provide a simulation to a user of the new data storage and recovery software,
wherein the simulation of the new data storage and recovery software incorporates the extracted characteristics of the subset of the multiple computing devices in the simulation to enable the user to test features of the new data storage and recovery software on simulated versions of the subset of the multiple computing devices,
wherein the remote computing device is external to the computing system; and
a providing unit configured to provide a list of software licenses for the new data storage and recovery software based on the subset of the multiple identified computing devices of the computing system,
wherein the software licenses are licenses to individual software components of the new data storage and recovery software,
wherein the list of the software licenses includes prices for the software licenses.

15. The discovery agent of claim 14, further comprising:
a second identifying unit configured to, if the determining unit determines that the existing data storage and recovery software is not installed in the computing system, identify at least the subset of the multiple computing devices of the computing system by:
scanning the computing system for network addresses of the at least subset of the multiple computing devices, and
querying the at least subset of the multiple computing devices based on the network addresses to retrieve the extracted characteristics of the at least subset of the multiple computing devices, wherein the extracted characteristics include:
name,
data storage capacity,
type of operating system used by the at least subset of the multiple computing devices, and
whether the at least subset of the multiple computing devices operate as a server.

16. The discovery agent of claim 14 wherein locating the system content file in the file system of the network management computing device, includes:
searching the directories of the file system of the network management computing device, if searching the one or more predetermined paths in the file system of the network management computing device fails to result in locating the system content file, or
receiving a file system path of the system content file from the user via the user interface, if searching the one or more predetermined paths in the file system of the network management computing device fails to result in locating the system content file.

17. The discovery agent of claim 14 wherein providing the list of software licenses based on the subset of the multiple computing devices of the computing system includes:
determining network throughput between the subset of the multiple computing devices;
determining a frequency of backup operations for the subset of the multiple computing devices;
determining a storage capacity of the subset of the multiple computing devices; and
determining a recommended number of media agents to include in the computing system based on data load on the network, wherein the data load is based on the network throughput, the frequency of backup operations, and the storage capacity of the subset of the multiple computing devices, wherein a media agent manages a creation and restoration of backup copies of data generated by the subset of the multiple computing devices.

18. The discovery agent of claim 14 wherein a portion of the discovery agent operates on the remote computing device, wherein the remote computing device provides multiple configurations of the simulated versions of the subset of the multiple computing devices in the simulation of the new data storage and data recovery software to enable the user to determine which one of the multiple configurations to use while installing the new data storage and recovery software.

19. The discovery agent of claim 14, further comprising:
a receiving unit configured to receive assignments of the individual software components to the subset of the multiple computing devices of the computing system from the user via the user interface, wherein receiving the assignments includes:
displaying a graphical representation of the subset of the multiple computing devices on the user interface;
displaying a user-manipulatable version of the list of software licenses; and
enabling each item of the list of software licenses to be dragged and dropped by the user onto the graphical representation of the subset of the multiple computing devices,
wherein the individual software components correspond to respective items of the list of software licenses.

20. The discovery agent of claim 14, further comprising:
a copying unit configured to copy the extracted characteristics of the subset of the multiple computing devices into a database for the new data storage and recovery software to enable the installation of the new data storage and recovery software to manage backup jobs and stored backup copies that were created by the existing data storage and recovery software prior to the installation or operation of the new data storage and recovery software.

* * * * *